(12) United States Patent
Chen et al.

(10) Patent No.: US 9,386,576 B2
(45) Date of Patent: Jul. 5, 2016

(54) PUCCH RESOURCE DETERMINATION FOR EPDCCH

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 13/964,978

(22) Filed: Aug. 12, 2013

(65) Prior Publication Data

US 2014/0133370 A1    May 15, 2014

Related U.S. Application Data

(60) Provisional application No. 61/726,571, filed on Nov. 14, 2012, provisional application No. 61/754,078, filed on Jan. 18, 2013.

(51) Int. Cl.
*H04J 3/00* (2006.01)
*H04W 72/04* (2009.01)

(52) U.S. Cl.
CPC .................... *H04W 72/042* (2013.01)

(58) Field of Classification Search
CPC .................................................. H04W 72/042
USPC ......................................................... 370/280
See application file for complete search history.

(56) References Cited

U.S. PATENT DOCUMENTS 9,026,140 B2 *  5/2015  Siomina et al. ............. 455/456.1
9,143,283 B2 *  9/2015  Liu ....................... H04L 1/1671
9,198,181 B2 * 11/2015  Blankenship
(Continued)

FOREIGN PATENT DOCUMENTS

WO   WO-2009099274 A1   8/2009
WO   WO-2013015627 A2   1/2013
WO   WO-2013048114 A2   4/2013

OTHER PUBLICATIONS

Alcatel-Lucent Shanghai Bell et al., "DCI Multiplexing for ePDCCH," 3GPP TSG RAN WG1 Meeting #68 bis, R1-121253, Mar. 26-30, 2012, 3 pgs., Jeju, Korea.
(Continued)

*Primary Examiner* — Guang Li
(74) *Attorney, Agent, or Firm* — Holland & Hart LLP

(57) ABSTRACT

Methods, systems, and devices are described for indexing control channel elements to determine uplink channel resources. Downlink control messages may be monitored in a set of downlink subframes. The monitoring may include monitoring physical downlink control channel (PDCCH) messages in at least one of the subframes and monitoring enhanced physical downlink control channel (EPDCCH) messages in at least one of the subframes. A downlink control message may be received in at least one subframe. The downlink control message may include an EPDCCH message. An index for enhanced control channel elements (ECCEs) may be determined based at least in part on the set of downlink subframes. The determined index of the ECCEs may be used to identify uplink control channel resources. The ECCEs may be indexed in a manner that is specific to a cell in a wireless communication system, or which is configured for a particular mobile device.

57 Claims, 16 Drawing Sheets

(56) References Cited

U.S. PATENT DOCUMENTS

| | | | |
|---|---|---|---|
| 2012/0320848 A1* | 12/2012 | Chen | H04L 5/0055 370/329 |
| 2013/0039284 A1 | 2/2013 | Marinier et al. | |
| 2013/0039291 A1 | 2/2013 | Blankenship et al. | |
| 2013/0039299 A1 | 2/2013 | Papasakellariou et al. | |
| 2013/0044664 A1* | 2/2013 | Nory | H04L 1/0045 370/311 |
| 2013/0083753 A1* | 4/2013 | Lee et al. | 370/329 |
| 2013/0188577 A1* | 7/2013 | Papasakellariou | H04W 72/04 370/329 |
| 2013/0194931 A1* | 8/2013 | Lee et al. | 370/241 |
| 2013/0230030 A1* | 9/2013 | Papasakellariou | H04W 72/0406 370/336 |
| 2013/0242890 A1* | 9/2013 | He | H04L 5/1469 370/329 |
| 2013/0301434 A1* | 11/2013 | Krishnamurthy et al. | 370/252 |
| 2013/0322352 A1* | 12/2013 | Han et al. | 370/329 |
| 2014/0003375 A1* | 1/2014 | Nam | H04W 72/0406 370/329 |
| 2014/0036747 A1* | 2/2014 | Nory et al. | 370/311 |
| 2014/0036810 A1* | 2/2014 | Harrison | H04W 72/042 370/329 |
| 2014/0044062 A1* | 2/2014 | Ye | H04W 72/0453 370/329 |
| 2014/0092821 A1* | 4/2014 | Zhu et al. | 370/329 |
| 2014/0092822 A1* | 4/2014 | Koorapaty | H04L 5/0039 370/329 |
| 2014/0307560 A1* | 10/2014 | Kim | H04L 5/001 370/241 |

OTHER PUBLICATIONS

Asustek, "PUCCH Resource Allocation Corresponding to ePDCCH," 3GPP TSG RAN WG1 Meeting #68, R1-120666, Feb. 6-10, 2012, 2 pgs., Dresden, Germany.

Huawei, et al., "PUCCH ACK/NACK Resource Determination for EPDCCH," 3GPP TSG RAN WG1 Meeting #71, R1-125155, Nov. 12-16, 2012, 7 pgs., New Orleans, USA.

ISA/EPO, International Search Report and the Written Opinion, Int'l Patent App. No. PCT/US2013/065027, Jan. 7, 2014, 13 pgs.

LG Electronics, "UE Behaviors According to Search Space Configuration," 3GPP TSG RAN WG1 Meeting #67, R1-113993, Nov. 14-18, 2011, 2 pgs., San Francisco, USA.

New Postcom, "Remaining Aspects of PUCCH Resource Allocation for EPDCCH," 3GPP TSG RAN WG1 Meeting #71, R1-124798, Nov. 12-16, 2012, 5 pgs., New Orleans, USA.

Qualcomm Incorporated, "PUCCH Resource Allocation for EPDCCH," 3GPP TSG RAN WG1 #70bis, R1-124453, Oct. 8-12, 2012, 2 pgs., San Diego, USA.

Research in Motion, "PUCCH A/N Resource Mapping for MU-MIMO Transmission of eEPDCCH," 3GPP TSG RAN WG1 Meeting #70bis, R1-124246, Oct. 8-12, 2012, 8 pgs., San Diego, USA.

\* cited by examiner

PUCCH RESOURCE DETERMINATION FOR EPDCCH

CROSS REFERENCES

The present application for patent claims priority benefit of U.S. Provisional Patent Application No. 61/726,571 by Chen et al., entitled "PUCCH Resource Determination for EPDCCH," filed Nov. 14, 2012 and U.S. Provisional Patent Application No. 61/754,078 by Chen et al., entitled "PUCCH RESOURCE DETERMINATION FOR EPDCCH," filed Jan. 18, 2013. Both applications are assigned to the assignee hereof.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or Node-Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. Physical downlink control channel (PDCCH) carries resource assignments for UEs. The resource assignments are carried in downlink control information (DCI) messages. An enhanced PDCCH (EPDCCH) has been introduced in wireless communications to support increased downlink control channel capacity.

SUMMARY

Described embodiments are directed to systems and methods to identify uplink channel resources based on indexing of downlink control channel elements. In one configuration, downlink control messages are monitored in a set of downlink subframes. The set of subframes may be an association set, where each downlink subframe uses a common uplink subframe for HARQ feedback information. In one embodiment, physical downlink control channel (PDCCH) messages and enhanced physical downlink control channel (EPDCCH) messages may be monitored in at least a subset of subframes of the set. At least one downlink control message may be received in a subframe of the set. An index for enhanced control channel elements (ECCEs) used to monitor the EPDCCH messages may be determined. In one example, the ECCEs may be indexed across each subframe of the association set. In one configuration, uplink control channel resources may be identified based at least in part on the index of the ECCEs. An acknowledgement/negative acknowledgement (ACK/NACK) indication associated with the received downlink control message may be transmitted. The ACK/NACK indication may be transmitted on the identified uplink control channel resources.

In one configuration, the index for ECCEs may be determined based upon a total number of subframes in the set of downlink subframes. The total number of subframes may include subframes in which PDCCH messages are monitored and subframes in which EPDCCH messages are monitored.

In one example, transmitting the ACK/NACK indication may include transmitting the ACK/NACK indication in a single uplink subframe. The single uplink subframe may be a common uplink subframe for each of the subframes in the set of downlink subframes.

In one embodiment, the ECCEs used to monitor the EPDCCH messages may be indexed. Indexing the ECCEs may include incrementing an index value in one or more subframes in the set of downlink subframes. The index value may be incremented in each subframe in the set of downlink subframes. A configuration may be received to configure a plurality of EPDCCH resource sets. Each EPDCCH resource set may include two or more physical resource block (PRB) pairs. The index value for each respective EPDCCH resource set in each subframe in the set of downlink subframes may be incremented.

Each subframe in the set of downlink subframes may include one of the PDCCH messages or the EPDCCH messages. In one example, each subframe in the set of downlink subframes may include the EPDCCH messages.

In one configuration, at least one downlink control message may be received in at least one subframe in the set of downlink subframes. The downlink control message may include a PDCCH message. An index may be determined for control channel elements (CCEs) used to monitor the PDCCH messages. The determination may be based at least in part on the set of downlink subframes. Uplink control channel resources may be identified based at least in part on the index of the CCE. An ACK/NACK indication may be transmitted for the received downlink control message that includes a PDCCH message. The ACK/NACK indication may be transmitted on the identified uplink control channel resources.

In one embodiment, the index for CCEs may be determined based upon a total number of subframes in the set of downlink subframes. The total number of subframes may include subframes in which PDCCH messages are monitored and subframes in which EPDCCH messages are monitored.

An index associated with the EPDCCH messages may be identified. The index may be based on all of the subframes in the set of downlink subframes. Each of the subframes in the set of downlink subframes may be contiguous downlink subframes.

In one example, the wireless communication described herein may be performed in a wireless communication system that includes a time division duplexed (TDD) long term evolution (LTE) system. The number of subframes in the set of downlink subframes may depend at least in part on a downlink and uplink subframe configuration specified for the TDD LTE system. In one configuration, the downlink control message may include a downlink control information (DCI) channel message.

The EPDCCH messages may be monitored in a search space specific to the mobile device. In another embodiment, the EPDCCH messages may be monitored in a search space common to two or more mobile devices.

An apparatus for indexing control channel elements in wireless communications is also described. The apparatus may include means for monitoring downlink control messages in a set of downlink subframes. The monitoring may include monitoring physical downlink control channel (PDCCH) messages in at least one of the subframes of the set and monitoring enhanced physical downlink control channel (EPDCCH) messages in at least one of the subframe of the set. The apparatus may also include means for receiving at least one downlink control message in at least one subframe in the set of downlink subframes. The downlink control message may include an EPDCCH message. The apparatus may further include means for determining, based at least in part on the set of downlink subframes, an index for enhanced control channel elements (ECCEs) used to monitor the EPDCCH messages, and means for identifying uplink control channel resources based at least in part on the index of the ECCEs. Additionally, the apparatus may include means for transmitting an acknowledgement/negative acknowledgement (ACK/NACK) indication associated with the received downlink control message. The ACK/NACK indication may be transmitted on the identified uplink control channel resources.

An apparatus for indexing control channel elements in wireless communications is also described. The apparatus may include a processor and memory in electronic communication with the processor. Instructions may be stored in the memory. The instructions may be executable by the processor to monitor downlink control messages in a set of downlink subframes. The monitoring may include monitoring physical downlink control channel (PDCCH) messages in at least one of the subframes of the set and monitoring enhanced physical downlink control channel (EPDCCH) messages in at least one of the subframe of the set. The instructions may be executable by the processor to receive at least one downlink control message in at least one subframe in the set of downlink subframes. The downlink control message may include an EPDCCH message. The instructions may be executable by the processor to determine, based at least in part on the set of downlink subframes, an index for enhanced control channel elements (ECCEs) used to monitor the EPDCCH messages, identify uplink control channel resources based at least in part on the index of the ECCEs, and transmit an acknowledgement/negative acknowledgement (ACK/NACK) indication associated with the received downlink control message. The ACK/NACK indication may be transmitted on the identified uplink control channel resources.

A computer program product for indexing control channel elements in wireless communications is also described. The computer program product may include a non-transitory computer-readable medium storing instructions executable by a processor to monitor downlink control messages in a set of downlink subframes. The monitoring may include monitoring physical downlink control channel (PDCCH) messages in at least one of the subframes of the set and monitoring enhanced physical downlink control channel (EPDCCH) messages in at least one of the subframe of the set. The instructions may be executable by the processor to receive at least one downlink control message in at least one subframe in the set of downlink subframes. The downlink control message may include an EPDCCH message. The instructions may be executable by the processor to determine, based at least in part on the set of downlink subframes, an index for enhanced control channel elements (ECCEs) used to monitor the EPDCCH messages, identify uplink control channel resources based at least in part on the index of the ECCEs, and transmit an acknowledgement/negative acknowledgement (ACK/NACK) indication associated with the received downlink control message. The ACK/NACK indication may be transmitted on the identified uplink control channel resources.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to systems and methods to perform wireless communication. In one configuration, downlink control messages are monitored in a set of downlink subframes. The monitoring may include monitoring physical downlink control channel (PDCCH) messages in at least one of the subframes in the set and monitoring enhanced physical downlink control channel (EPDCCH) messages in at least one of the subframes in the set of downlink subframes. In one embodiment, a downlink control message may be received in at least one subframe in the set of downlink subframes. The downlink control message may include an EPDCCH message.

Upon receiving the downlink control message, an index for enhanced control channel elements (ECCEs) may be determined based at least in part on the set of downlink subframes. The ECCEs may be used to monitor the EPDCCH messages. The determined index of the ECCEs may be used to identify uplink control channel resources. In one embodiment, the ECCEs may be indexed in a continuous manner across each subframe of the set. An acknowledgement/negative acknowledgement (ACK/NACK) indication associated with the received downlink control message may be transmitted. In one example, the identified uplink control channel resources may be used to transmit the ACK/NACK indication.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
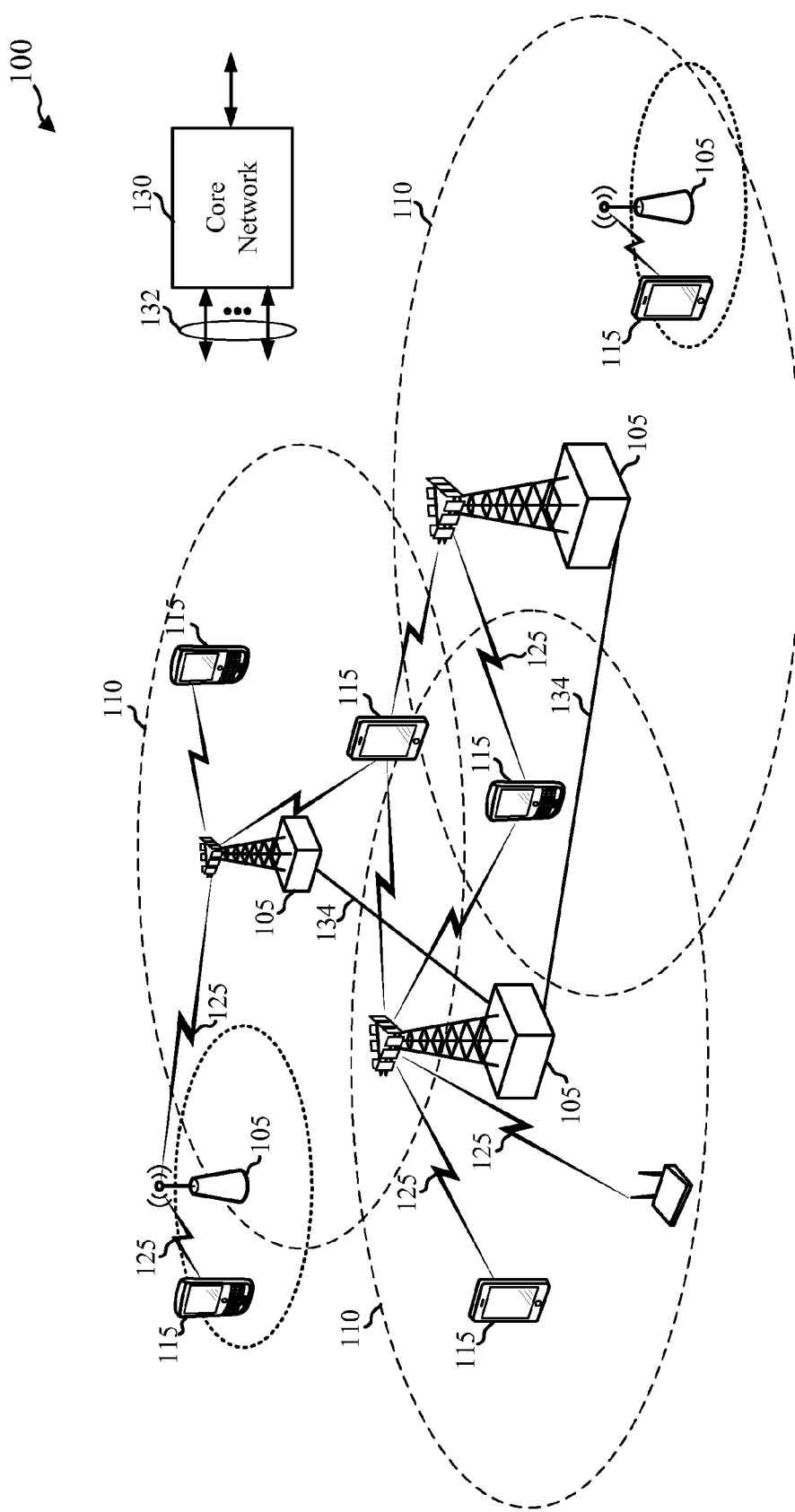
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing a radio resource control (RRC) connection, MCCH is used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information.

Logical traffic channels may include a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH), and a Paging Channel (PCH). The UL transport channels may include a random access channel (RACH), a request channel (REQCH), an uplink shared data channel (UL-SDCH), and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In one embodiment, a UE 115 may monitor for control messages on the downlink from an eNB 105. This may include monitoring PDCCH messages and EPDCCH messages in subframes of a set of downlink subframes. In one configuration, downlink control messages may include EPDCCH messages. When a downlink control message is received, the UE 115 may determine an index for ECCEs that are used to monitor the EPDCCH messages. Using the ECCE index, the UE 115 may identify uplink control resources. In one example, the UE 115 may transmit an ACK/NACK associated with the downlink control message. For example, the ACK/NACK may indicate the successful or unsuccessful receipt of the downlink control message. The ACK/NACK may be transmitted in an uplink subframe using the uplink control channel resources identified from the ECCE index. In one embodiment, the ECCE indexing may be based on each subframe of the set of downlink subframes, regardless of whether a particular subframe is configured for EPDCCH messages. In another embodiment, the indexing of ECCEs may be based on the subframes of the set that are configured for EPDCCH messages.

Figure 2:
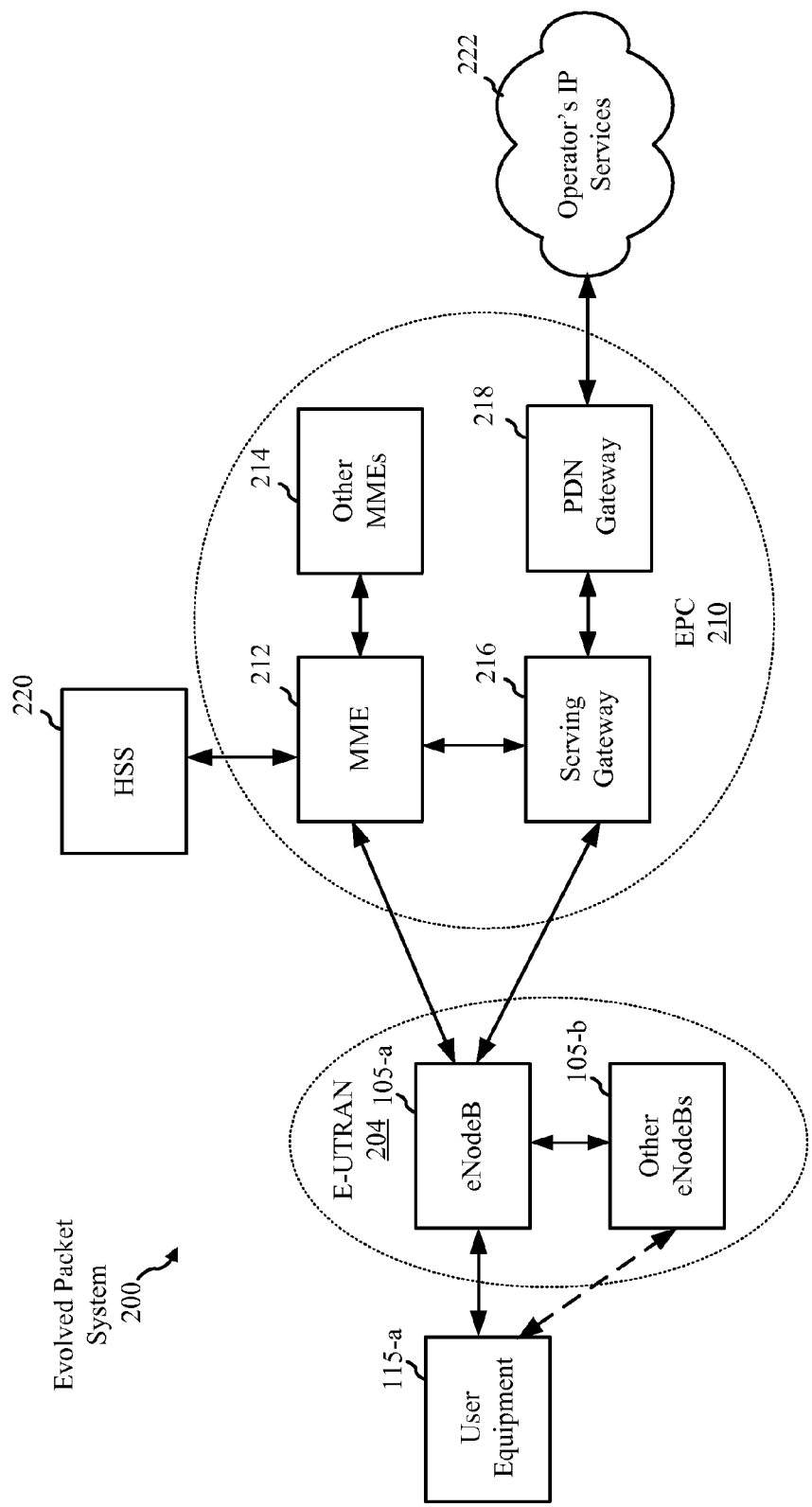
FIG. 2 is a diagram illustrating an LTE/LTE-Advanced network architecture in accordance with various embodiments.

FIG. 2 is a diagram illustrating an LTE/LTE-Advanced network architecture 200 in accordance with various embodiments. The LTE/LTE-A network architecture 200 may be referred to as an Evolved Packet System (EPS) 200. The EPS 200 may include one or more UEs 115, an Evolved UMTS Terrestrial Radio Access Network (E-UTRAN) 205, an Evolved Packet Core (EPC) 230, a Home Subscriber Server (HSS) 220, and an Operator's IP Services 222. The EPS 200 may interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN 205 may include an eNB 105-a and other eNBs 105-b. The eNB 105-a may provide user and control plane protocol terminations toward the UE 115-a. The eNB 105-a may be connected to the other eNBs 105-b via an X2 interface (e.g., backhaul). The eNB 105-a may provide an access point to the EPC 230 for the UE 115-a. The eNB 105-a may be connected by an S1 interface to the EPC 230. The EPC 230 may include one or more Mobility Management Entities (MMES) 232, one or more Serving Gateways 234, and one or more Packet Data Network (PDN) Gateways 236. The MME 232 may be the control node that processes the signaling between the UE 115-a and the EPC 230. Generally, the MME 232 may provide bearer and connection management. All user IP packets may be transferred through the Serving Gateway 234, which itself may be connected to the PDN Gateway 236. The PDN Gateway 236 may provide UE IP address allocation as well as other functions. The PDN Gateway 236 may be connected to the Operator's IP Services 222. The Operator's IP Services 222 may include the Internet, the Intranet, an IP Multimedia Subsystem (IMS), and a Packet-Switched (PS) Streaming Service (PSS).

The UE 115-a may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

In one embodiment, an eNB 105-a may transmit downlink control messages to the UE 115-a. The messages may include EPDCCH messages. In one configuration, downlink control messages may be received in one or more downlink subframes. A group of downlink subframes may form an association set. In one example, a single uplink subframe may be associated with the association set. As a result, HARQ feedback information for each of the subframes in the association set may be transmitted in the single uplink subframe. Uplink resources used to transmit the HARQ feedback may be identified from the indexing of ECCEs that are used to monitor the EPDCCH messages. In some embodiments, the ECCE indexing may be based on each subframe of the association set, even if a particular subframe is not configured for EPDCCH messages. In another embodiment, the ECCE indexing may be based on the subframes of the association set that are configured for EPDCCH messages. The subframes that are not configured for EPDCCH messages may be configured for PDCCH messages.

Figure 3:
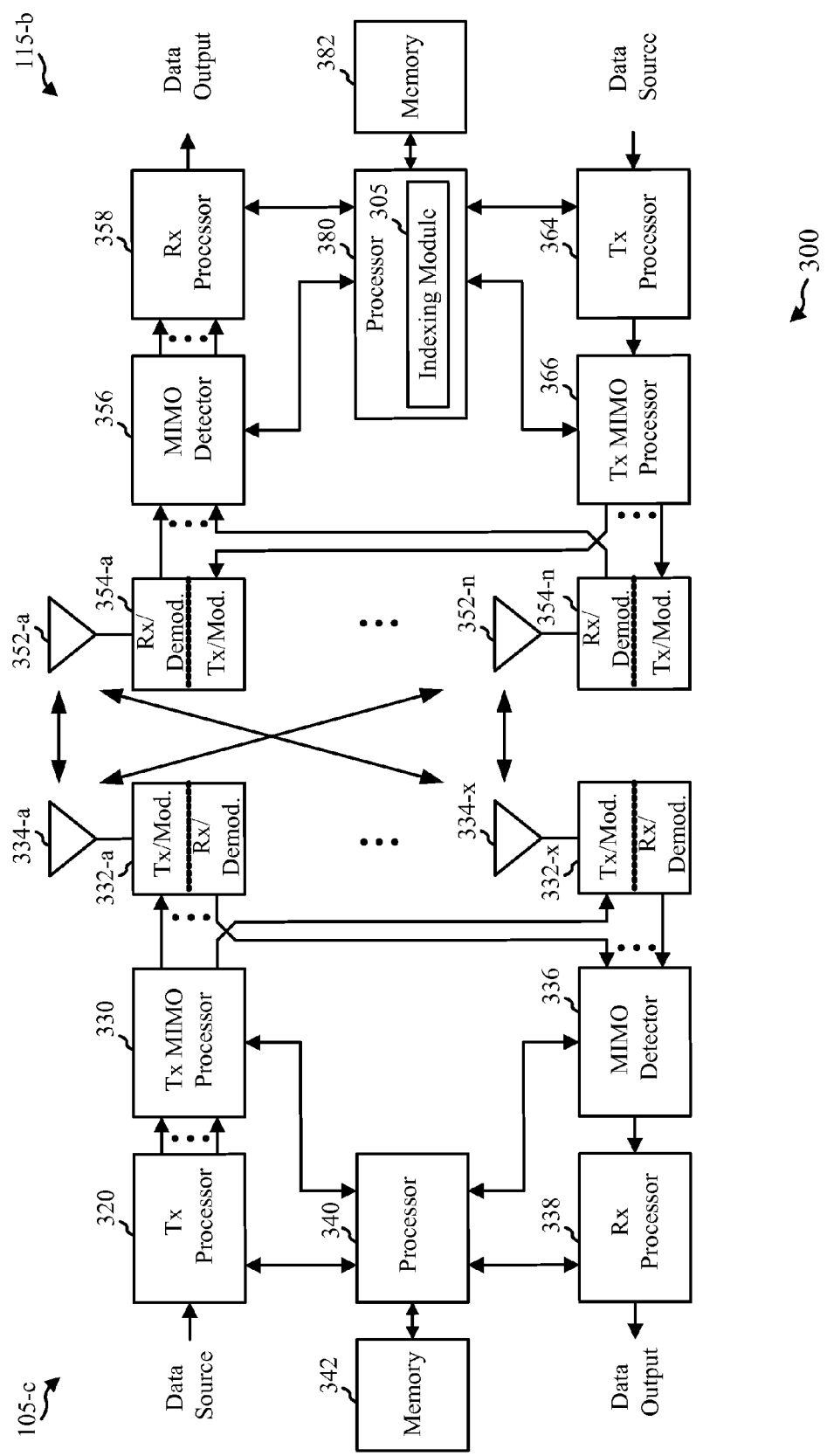
FIG. 3 is a block diagram of a multiple-input, multiple-output (MIMO) communication system in accordance with various embodiments.

FIG. 3 is a block diagram of a MIMO communication system 300 including a base station 105-c and a mobile device 115-b. This system 300 may illustrate aspects of the system 100 of FIG. 1 and/or system 200 of FIG. 2. The base station 105-c may be equipped with antennas 334-a through 334-x, and the mobile device 115-b may be equipped with antennas 352-a through 352-n. In the system 300, the base station 105-c may be able to send data over multiple communication links at the same time. Each communication link may be called a "layer" and the "rank" of the communication link may indicate the number of layers used for communication. For example, in a 2×2 MIMO system where base station 105-c transmits two "layers," the rank of the communication link between the base station 105-c and the UE 115-b is two.

At the base station 105-c, a transmit processor 320 may receive data from a data source. The transmit processor 320 may process the data. The transmit processor 320 may also generate reference symbols, and a cell-specific reference signal. A transmit (TX) MIMO processor 330 may perform spatial processing (e.g., precoding) on data symbols, control symbols, and/or reference symbols, if applicable, and may provide output symbol streams to the transmit modulators 332-a through 332-x. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink (DL) signal. In one example, DL signals from modulators 332-a through 332-x may be transmitted via the antennas 334-a through 334-x, respectively.

At the mobile device 115-b, the mobile device antennas 352-a through 352-n may receive the DL signals from the base station 105-c and may provide the received signals to the demodulators 354-a through 354-n, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354-a through 354-n, perform MIMO detection on the received symbols if applicable, and provide detected symbols. A receive processor 358 may process (e.g., demodulate, deinterleave, and decode) the detected symbols, providing decoded data for the mobile device 115-b to a data output, and provide decoded control information to a processor 380, or memory 382. The processor 380 may include an indexing module 305. The indexing module 305 may index control channel elements (CCEs) and ECCEs that are used to for PDCCH messages and EPDCCH messages, respectively. The indexing module 305 may index ECCEs across each subframe in an association set, even if some subframes in the set are not configured for EPDCCH. In another embodiment, the indexing module 305 may index ECCEs based on the subframes in the set that are configured for EPDCCH. Similarly, the module 305 may index CCEs across each subframe in an association set, regardless of whether a subframe is configured for PDCCH. Alternatively, the indexing module 305 may index CCEs in subframes of the set that are configured for PDCCH.

On the uplink (UL), at the mobile device 115-b, a transmit processor 364 may receive and process data from a data source. The transmit processor 364 may also generate reference symbols for a reference signal. The symbols from the transmit processor 364 may be precoded by a transmit MIMO processor 366 if applicable, further processed by the demodulators 354-a through 354-n (e.g., for SC-FDMA, etc.), and be transmitted to the base station 105-c in accordance with the transmission parameters received from the base station 105-c. At the base station 105-c, the UL signals from the mobile device 115-b may be received by the antennas 334, processed by the demodulators 332, detected by a MIMO detector 336 if applicable, and further processed by a receive processor. The receive processor 338 may provide decoded data to a data output and to the processor 340. In one configuration, the processor 340 may generate indexing instructions to transmit to the mobile device 115-b. The indexing instructions may instruct the mobile device 115-b whether ECCE indexing and/or CCE indexing should be performed across each subframe of an association set or for only those subframes that are configured for EPDCCH (or PDCCH).

The components of the device 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors. Each of the noted modules may be a means for performing one or more functions related to operation of the system 300.

Similarly, the components of the base station 105-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors. Each of the noted components may be a means for performing one or more functions related to operation of the system 300.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Wireless networks 100, 200, and/or 300 may support operation on multiple carriers, which may be referred to as carrier aggregation (CA) or multi-carrier operation. A carrier may also be referred to as a component carrier (CC), a cell, etc. The terms "carrier", "CC", and "cell" are used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

Figure 4:
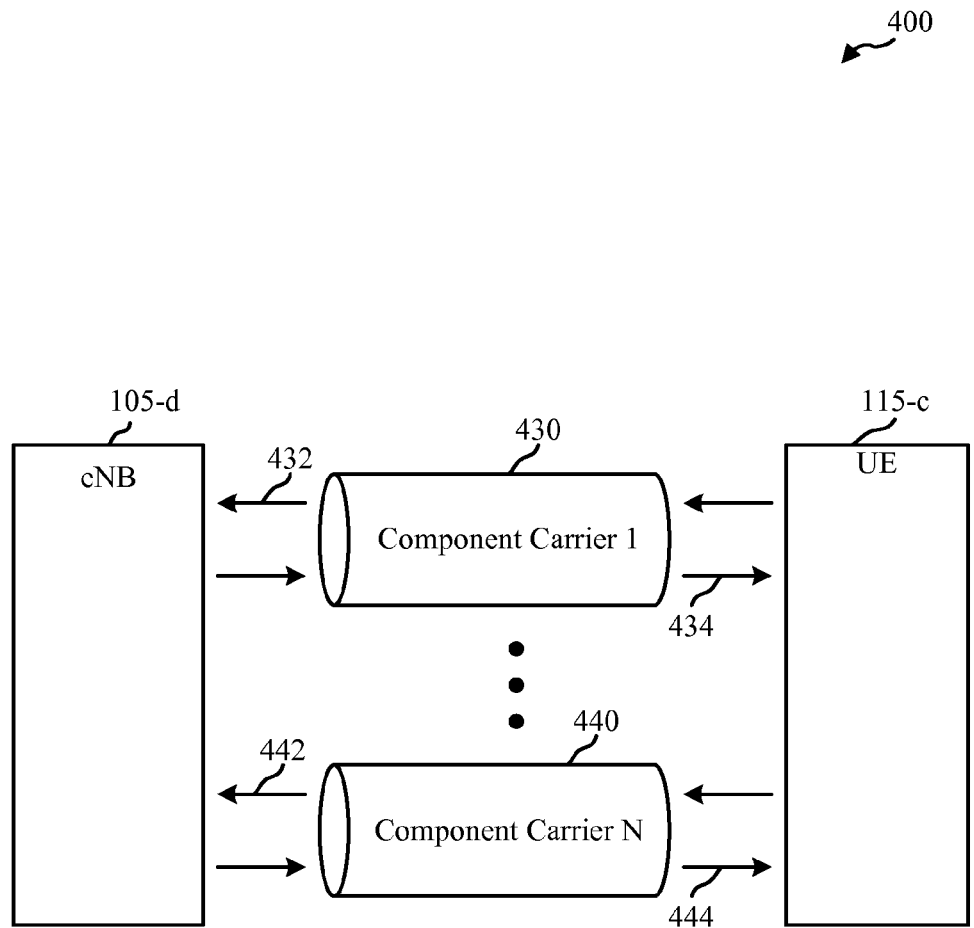
FIG. 4 illustrates a system that can be used in accordance with the disclosed embodiments.

FIG. 4 illustrates a system 400 that can be used in accordance with the disclosed embodiments. The system 400 can include a user equipment 115-c, which can communicate with an evolved Node B (eNB) 105-d (e.g., a base station, access point, etc.) using one or more component carriers 1 through N ($CC_1$-$CC_N$). While only one user equipment 115-c and one eNB 105-d are illustrated in FIG. 4, it will be appreciated that the system 400 can include any number of user equipments 115 and/or eNBs 105. The eNB 105-d can transmit information to the user equipment 115-c over forward (downlink) channels 432 through 442 on component carriers $CC_1$ through $CC_N$. In addition, the user equipment 115-c can transmit information to the eNB 105-d over reverse (uplink) channels 434 through 444 on component carriers $CC_1$ though $CC_N$. In describing the various entities of FIG. 4, as well as other figures associated with some of the disclosed embodiments, for the purposes of explanation, the nomenclature associated with a 3GPP LTE or LTE-A wireless network is used. However, it is to be appreciated that the system 400 can operate in other networks such as, but not limited to, an OFDMA wireless network, a CDMA network, a 3GPP2 CDMA2000 network and the like.

In LTE-A based systems, the user equipment 115-c can be configured with multiple component carriers utilized by the eNB 105-d to enable a wider overall transmission bandwidth. As illustrated in FIG. 4, the user equipment 115-c can be configured with "component carrier 1" 430 through "component carrier N" 440, where N is an integer greater than or equal to one. While FIG. 4 depicts two component carriers, it is to be appreciated that the user equipment 115-c can be configured with any suitable number of component carriers and, accordingly, the subject matter disclosed herein and the claims are not limited to two component carriers. In one example, some of the multiple component carriers can be LTE Rel-8 carriers. Thus, some of the component carriers can appear as an LTE Rel-8 carrier to a legacy (e.g., an LTE Rel-8 based) user equipment. Component carrier 430 through 440 can include respective downlinks 432 through 442 as well as respective uplinks 434 through 444.

In multi-carrier operations, the DCI messages associated with different user equipments can be carried on a plurality of component carriers. For example, the DCI on a PDCCH and/or an EPDCCH can be included on the same component carrier that is configured to be used by a user equipment for PDSCH transmissions (i.e., same-carrier signaling). Alternatively, or additionally, the DCI may be carried on a component carrier different from the target component carrier used for PDSCH transmissions (i.e., cross-carrier signaling). In some embodiments, a carrier indicator field (CIF), which may be semi-statically enabled, may be included in some or all DCI formats to facilitate the transmission of PDCCH and/or EPDCCH control signaling from a carrier other than the target carrier for PDSCH transmissions (cross-carrier signaling).

Figure 5:
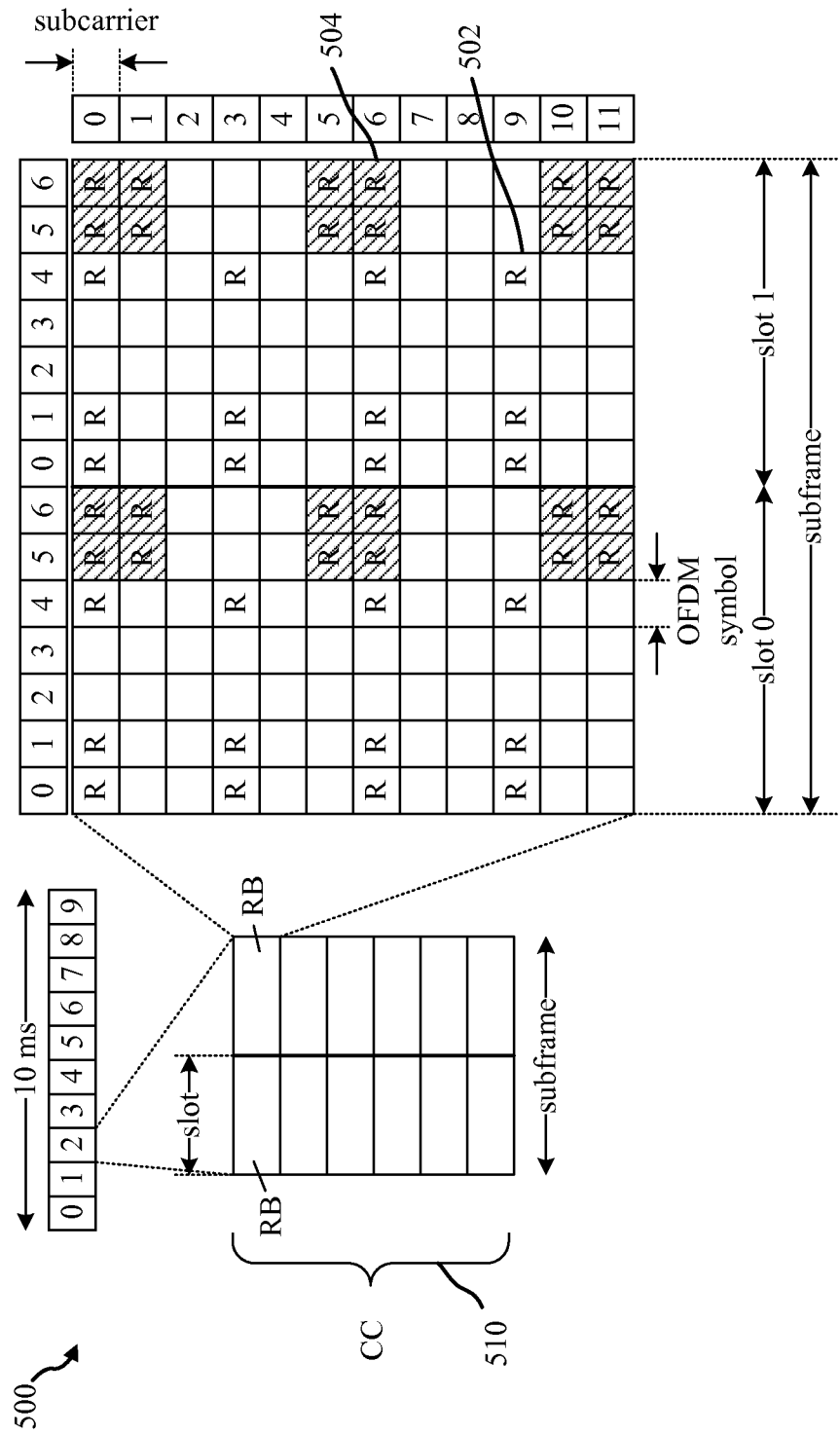
FIG. 5 is a diagram illustrating an example of a frame structure that may be used in a wireless communication system.

FIG. 5 is a diagram illustrating an example of a frame structure 500 that may be used in a wireless communication system, including the wireless communication systems 100, 200, 300, and/or 400 described above with reference to the previous Figures. The frame structure 500 may be used in LTE or similar systems. A frame (10 ms) may be divided into 10 equally sized sub-frames. Each sub-frame may include two consecutive time slots. A component carrier 510 may be illustrated as a resource grid representing two time slots, each time slot including a resource block. The resource block may be divided into multiple resource elements.

In LTE, a resource block may contain 12 consecutive subcarriers in the frequency domain and, for a normal cyclic prefix in each OFDM symbol, 7 consecutive OFDM symbols in the time domain, or 84 resource elements. Some of the resource elements, as indicated as R 502, 504, may include DL reference signals (DL-RS). The DL-RS may include Cell-specific RS (CRS) (also sometimes called common RS) 502 and UE-specific RS (UE-RS) 504. UE-RS 504 may be transmitted only on the resource blocks upon which the corresponding physical DL shared channel (PDSCH) is mapped. The number of bits carried by each resource element may depend on the modulation scheme. Thus, the more resource blocks that a UE receives and the higher the modulation scheme, the higher the data rate may be for the UE.

When transmission diversity is used to transmit data, multiple versions of the same data may be transmitted over multiple channels. Each of the channels may be defined according to one or more partitions in a time domain (e.g., time slots), frequency domain (e.g., subcarriers), coding domain (e.g., CDMA coding), or antenna/direction (e.g., different antenna ports). Thus, using the example frame structure 500 of FIG. 5, transmission diversity may be achieved by transmitting the different versions of the data using different resource elements. However, transmission diversity may also be achieved by transmitting the different versions of the data using the same resource elements and different coding, antennas, or direction. Thus, a UE or base station that receives an interference signal corresponding to certain resource elements in a frame may monitor other resource elements for different versions of the same interference signal. The UE or base station may further monitor the same or different resource elements with respect to other coded or directional channels for different versions of the interference signal. If the UE or base station determines that transmission diversity is used with respect to the interference signal, the UE or base station may combine two or more of the received versions of the interference signal to estimate and cancel the interference signal.

Figure 6:
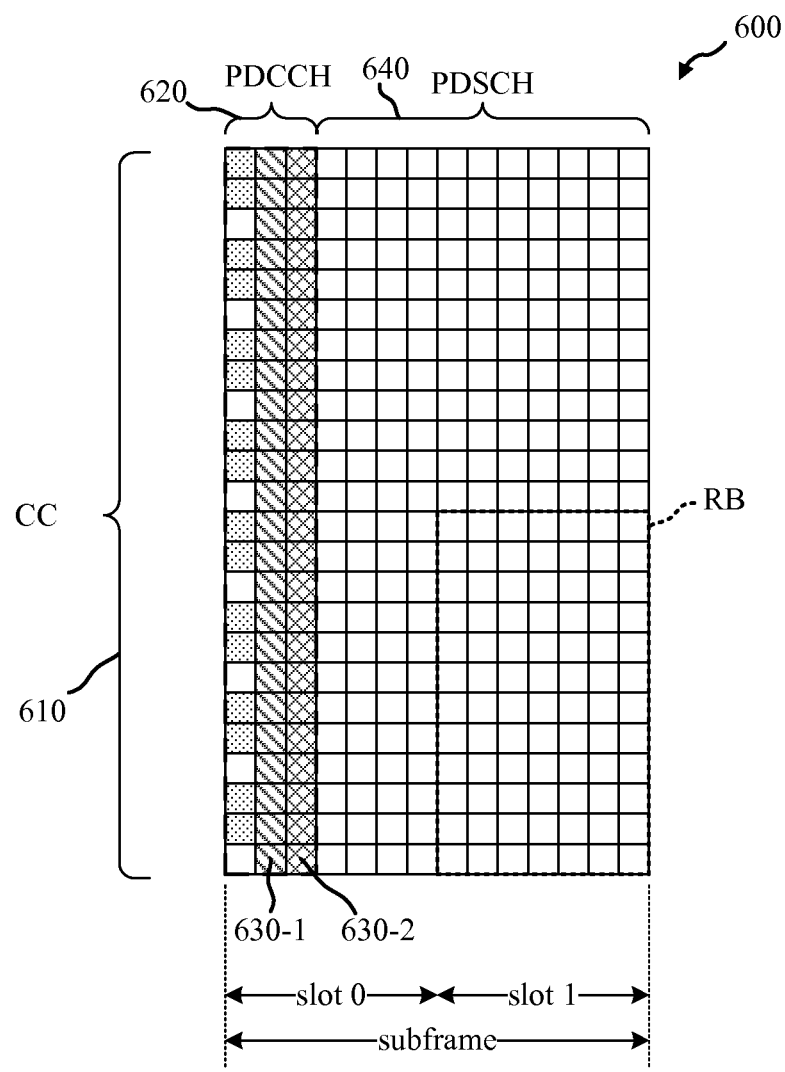
FIG. 6 illustrates an example frame structure for a component carrier, according to various embodiment.

Turning next to FIG. 6, an example frame structure 600 for a component carrier is illustrated, according to various embodiments. FIG. 6 may illustrate, for example, a frame structure 600 for a component carrier 610 for an LTE/LTE-A system. In LTE/LTE-A systems, the physical downlink shared channel (PDSCH) 640 carries the data and signaling information to the user equipment; while the physical downlink control channel (PDCCH) 620 carries a message known as downlink control information (DCI). In the illustrated example, the component carrier 610 is illustrated with 24 subcarriers for simplicity. It should be understood that component carrier 610 may be configured with more or fewer subcarriers in various embodiments.

As illustrated in FIG. 6, PDCCH 620 is generally time-division multiplexed with PDSCH 640 and generally is fully distributed within the entire bandwidth of the component carrier 610 within a first region of each subframe. In the example illustrated in FIG. 6, PDCCH 620 includes two PDCCH blocks 630-1 and 630-2. PDCCH 620 may include more or fewer PDCCH blocks 630 as is appropriate based on the control information for served UEs. The PHICH and/or PCFICH channels may be found in the first symbol of PDCCH 620, as illustrated by the shaded blocks in the first symbol of the illustrated subframe for component carrier 610.

The DCI includes information regarding the downlink scheduling assignments, uplink resource grants, transmission scheme, uplink power control, hybrid automatic return repeat request (HARQ) information, modulation and coding schemes (MCS) and other information. A DCI can be UE-specific (dedicated) or cell-specific (common) and placed in different dedicated and common search spaces within the PDCCH depending on the format of the DCI. A user equipment attempts to decode the DCI by performing a process known as a blind decode, during which a plurality of decode attempts are carried out in the search spaces until the DCI is detected.

The size of the DCI messages can differ depending on the type and amount of information that is carried by the DCI. For example, if spatial multiplexing is supported, the size of the DCI message is larger compared to scenarios where contiguous frequency allocations are made. Similarly, for a system that employs MIMO, the DCI must include additional signaling information that is not needed for systems that do not utilize MIMO. Accordingly, the DCI has been categorized in different formats that are suited for different configurations. The size of a DCI format depends not only on the amount of information that is carried within the DCI message, but also on other factors such as the transmission bandwidth, the number of antenna ports, TDD or FDD operating mode, etc.

It should be noted that in some systems, the DCI messages are also appended with cyclic redundancy check (CRC) bits to for error detection. The coded DCI bits are then mapped to control channel elements (CCEs) according to the DCI format. A PDCCH can carry DCI messages associated with multiple user equipments. A particular user equipment must, therefore, be able to recognize the DCI messages that are intended for that particular user equipment. To that end, a user equipment is assigned certain identifiers (e.g., a cell radio network temporary identifier—C-RNTI) that facilitate the detection of the DCI associated with that user equipment. To reduce signaling overhead, the CRC bits that are attached to each DCI payload are scrambled (e.g., masked) with the identifier (e.g., C-RNTI) associated with a particular user equipment and/or an identifier that is associated with a group of user equipments. In an operation known as a "blind decode," the user equipment can descramble (or de-mask) all potential DCI messages using its unique identifier, and perform a CRC check on the DCI payload. If the CRC check passes, the content of the control channel is declared valid for the user equipment, which can then process the DCI.

To reduce power consumption and overhead at the user equipment, a limited set of control channel element (CCE) locations can be specified, wherein the set of CCE locations include locations at which a DCI payload associated with a particular UE can be placed. For example, a CCE may consist of nine logically contiguous resource element groups (REGs), where each REG contains 4 resource elements (REs). Each RE is one frequency-time unit. CCEs can be aggregated at different levels (e.g., 1, 2, 4 and 8) depending on the DCI format and the system bandwidth. The set of CCE locations in which the user equipment can find its corresponding DCI messages are considered a search space. The search space can be partitioned into two regions: a common CCE region or search space and a UE-specific (dedicated) CCE region or search space. The common CCE region is monitored by all UEs served by an eNB and can include information such as paging information, system information, random access procedures and the like. The UE-specific CCE region includes user-specific control information and is configured individually for each user equipment. CCEs are numbered consecutively and common search spaces and UE-specific search spaces may span overlapping CCEs. The common search space may start from CCE 0, while UE specific search spaces have starting CCE indices that depend on the UE ID (e.g., C-RNTI), the subframe index, the CCE aggregation level and other random seeds.

In LTE/LTE-A, acknowledgement/negative acknowledgement (ACK/NACK) for downlink control information is performed by Hybrid ARQ Acknowledgement (HARQ-ACK) using the PUCCH. PUCCH resources for HARQ-ACK may be determined based on the number of the first CCE (i.e. lowest CCE index used to construct the PDCCH) used for transmission of the corresponding DCI assignment and other information (e.g., PUCCH offset, etc.) configured by higher layers. For FDD operation, HARQ-ACK for detected control information on the PDSCH may be reported in a PUCCH subframe determined based on the PDSCH subframe (e.g., n-4, etc.). For TDD operation, HARQ-ACK for detected control information may be reported in a PUCCH subframe that depends on the TDD association set M.

In LTE/LTE-A Rel. 11, an enhanced control channel EPDCCH is introduced. The main difference between the EPDCCH and PDCCH channels is that the EPDCCH may be scheduled in the time and frequency domains rather than generally being found in the control regions at the beginning of subframes spanning substantially the entire carrier bandwidth of the component carrier. The EPDCCH may increase control channel capacity and take advantage of gain mechanisms such as frequency domain scheduling, beamforming, and link adaptation previously only used to transmit data within the component carrier. In addition, the EPDCCH may help support frequency-domain inter-carrier interference cancellation (ICIC) and improve spatial reuse of control channel resources. UEs supporting EPDCCH may coexist on the same component carrier as legacy UEs supporting only PDCCH. Multiplexing of PDSCH and EPDCCH within a PRB pair is not permitted.

Figure 7:
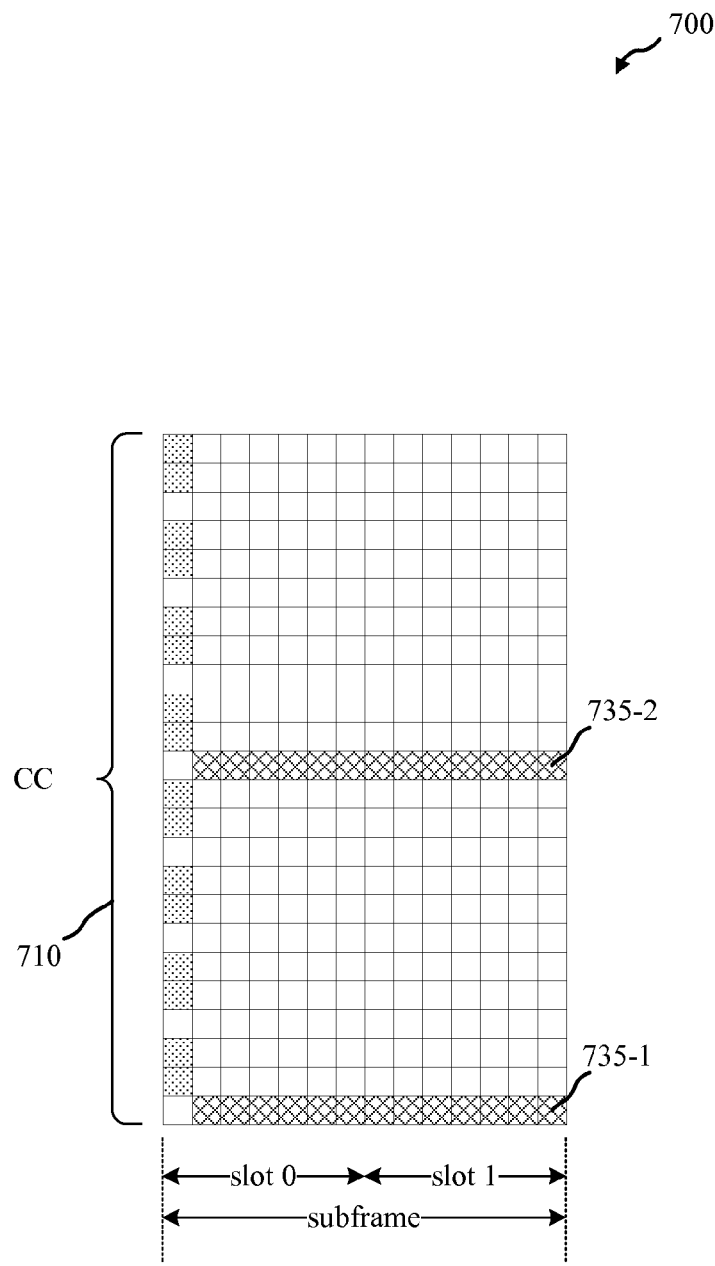
FIG. 7 illustrates an example frame structure of a component carrier employing an EPDCCH control channel in accordance with various embodiments.

FIG. 7 illustrates an example frame structure 700 of an LTE Rel. 11 component carrier 710 employing an EPDCCH control channel 735 in accordance with various embodiments. Similarly to the PDCCH, the EPDCCH may have one or more common search spaces and one or more UE-specific search spaces. While the PDCCH for a component carrier occupies substantially the full bandwidth of a component carrier at the beginning of a subframe, EPDCCH 735 may be scheduled over a subset of subcarriers of the component carrier 710 and over one or more subframes. An EPDCCH set may be defined as a group of N PRB pairs (e.g., each resource set may be its own size (e.g., 2, 4 or 8 PRB pairs)).

Each EPDCCH set may be configured for either localized or distributed EPDCCH. UEs do not monitor EPDCCH and PDCCH within the same subframe on the same component carrier. PRB pairs of EPDCCH sets with different logical EPDCCH set indices can be fully overlapped, partially overlapped, or non-overlapping. A UE can be configured to monitor EPDCCH in a subset of DL subframes. The UE may monitor PDCCH in subframes that are not configured for EPDCCH.

In embodiments, determining resource location for HARQ-ACK of EPDCCH may also be based on lowest ECCE index of the corresponding EPDCCH. Resource location for HARQ-ACK of EPDCCH may also be based on a starting offset for each EPDCCH set. The starting offset may be semi-statically configured for each UE.

In TDD operation, HARQ-ACK corresponding to M (e.g., 1, 2, 3, 4, etc.) DL subframes can be reported in one UL subframe, wherein M is referred to as an association set of downlink subframes. For HARQ-ACK with multiple PDCCH DL subframes, PUCCH resources may be based on the subframe within the association set for the corresponding PDCCH and the number of the first CCE used for transmission of the PDCCH within the subframe. PUCCH resources may also be based on starting offset and antenna port mapping.

Where EPDCCH is used in TDD operation, it is possible for a mixture of PDCCH and EPDCCH to be present within an association set of downlink subframes. Challenges are present when determining PUCCH resources for HARQ-ACK for a mixture of PDCCH and EPDCCH within the same association set M of downlink subframes.

Thus, it follows that a UE (e.g., UE 115) may be configured to monitor EPDCCH in a subset of DL subframes. A UE may monitor legacy PDCCH in subframes that are not configured to monitor EPDCCH. In the past, PUCCH resource allocation was determined by a single type of control channel within the same association set. However, when there is a mixture of PDCCH and EPDCCH within the same association set, a determination on how to specify CCE index and ECCE index for PUCCH is called for.

Figure 8:
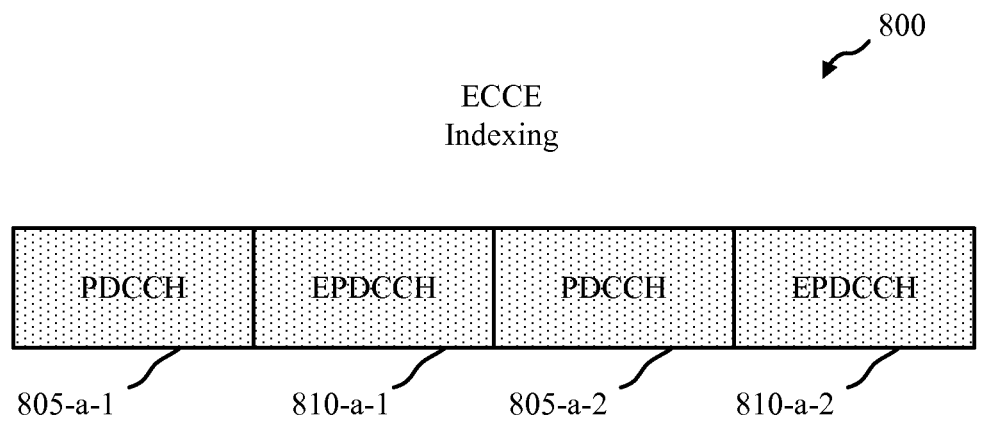
FIG. 8 illustrates an example of ECCE indexing.

In one example, ECCE indexing may be based on the total number of subframes within the same association set of M, regardless of the actual subframes the UE monitors for EPDCCH within the association set. For example, FIG. 8 illustrates an example ECCE indexing 800 defined based on four subframes even if EPDCCH is monitored only on a second subframe 810-*a*-1 and a fourth subframe 810-*a*-2 in the association set. The UE may monitor for PDCCH on a first subframe 805-*a*-1 and a third subframe 805-*a*-1. This may be referred to as continuous indexing, where the subframes are contiguous in time.

Figure 9:
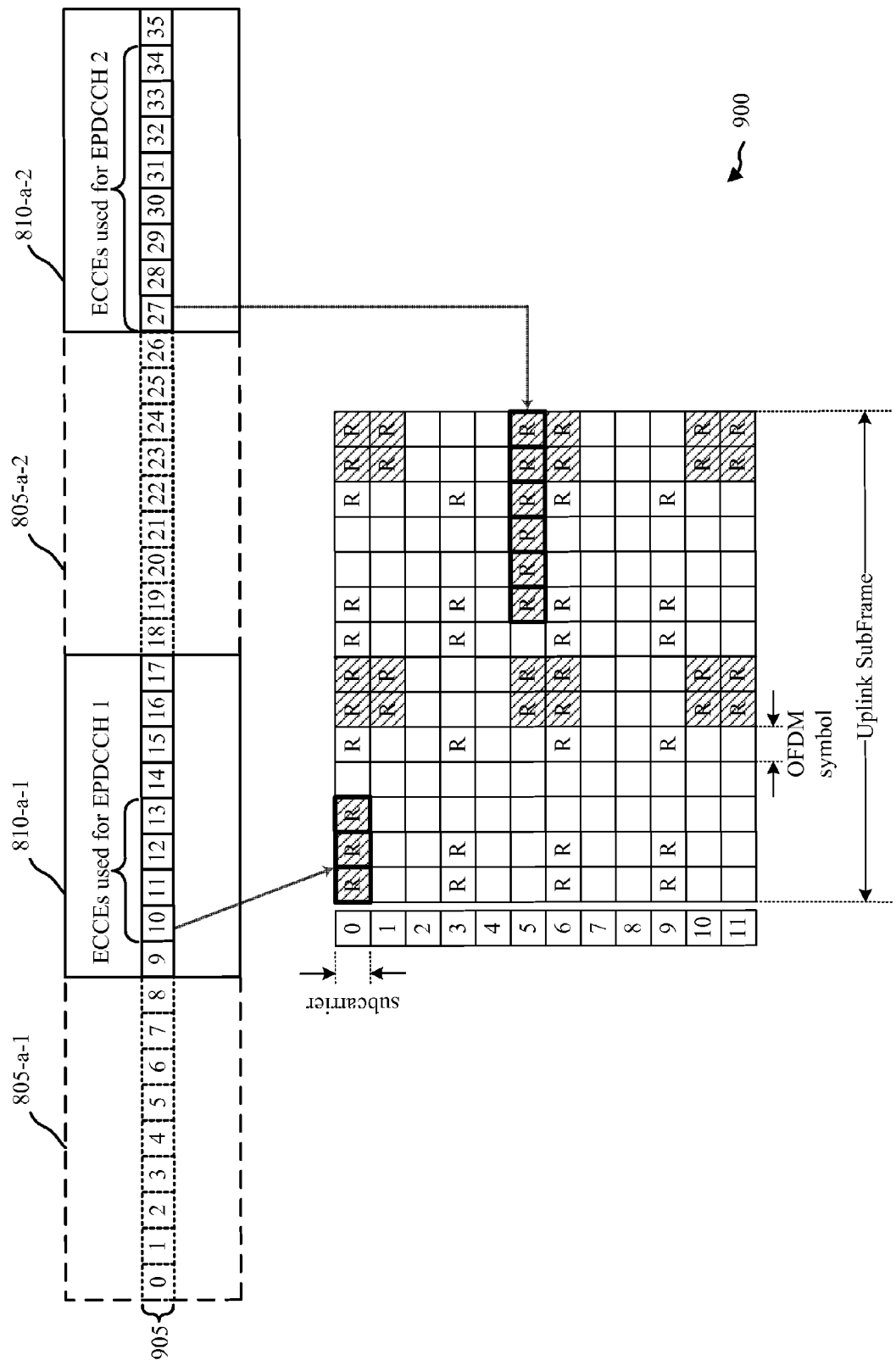
FIG. 9 is a block diagram illustrating one embodiment of continuous ECCE indexing.

FIG. 9 is a block diagram 900 illustrating one embodiment of continuous ECCE indexing. Subframes of an association set of downlink subframes may be configured for either PDCCH messages or EPDCCH messages. In one configuration, a first subframe 805-*a*-1 and a third subframe 805-*a*-2 may not be configured for EPDCCH messages. Instead, these subframes may be configured for PDCCH messages. However, the second subframe 810-*a*-1 and the fourth subframe 810-*a*-2 may be configured for EPDCCH.

In one example, ECCEs 905 used for EPDCCH messages may be indexed across each subframe, regardless of whether a particular subframe is configured for EPDCCH. As a result, the ECCE indexing in the first subframe 805-*a*-1 (which is not configured for EPDCCH) is 0-8, the ECCE indexing in the second subframe 810-*a*-1 (which is configured for EPDCCH) is 9-17, the ECCE indexing in the third subframe 805-*a*-2 (which is not configured for EPDCCH) may be 18-26, and the ECCE indexing in the fourth subframe 810-*a*-2 (which is configured for EPDCCH) may be 27-35.

When a UE 115 detects EPDCCH in a subframe, the index of the ECCEs used for that detected EPDCCH may be used to identify uplink channel resources. The identified uplink channel resources may be used to transmit ACK/NACK information in an uplink subframe. For example, a first EPDCCH may be detected in the second subframe 810-*a*-1. The index of the ECCEs used for the first EPDCCH may be used to map to uplink resources in an uplink subframe. These uplink resources may then be used to transmit the ACK/NACK in the uplink to the eNB. Further, a second EPDCCH may be detected in the fourth subframe 810-*a*-2. The index of the ECCEs used for this second EPDCCH may be used to identify the uplink channel resources to use for HARQ feedback information (e.g., ACK/NACK information) in the uplink. As illustrated, the indexing of the ECCEs may be defined by each subframe in the association set, even if a particular subframe (e.g., the first subframe 805-*a*-1 and the third subframe 805-*a*-2) are not configured for EPDCCH.

While only a single EPDCCH resource set is illustrated being detected in the second and fourth subframes, it is to be understood that more than one EPDCCH resource set may be detected in a single subframe. The indexing of ECCEs for each of the detected EPDCCHs in a particular subframe may be separate from each other. In one example, the a UE 115 may receive a configuration that configures a plurality of EPDCCH resource sets. Each EPDCCH resource set may include two or more physical resource block (PRB) pairs. In one configuration, an index value may be incremented for each respective EPDCCH resource set in each subframe of a set of downlink subframes.

In one embodiment, the number of ECCEs ($N_{ECCE1}$) used for a first EPDCCH resource set may be different than the number of ECCEs ($N_{ECCE2}$) used for a second EPDCCH resource set detected during the same subframe. The indexing of the ECCEs used for the first EPDCCH may be defined as 0 to ($N_{ECCE1}-1$) for the first subframe, $N_{ECCE1}$ to ($2N_{ECCE1}-1$) for the second subframe, ($2N_{ECCE1}$) to ($3N_{ECCE1}-1$) for the third subframe, and $3N_{ECCE1}$ to ($4N_{ECCE1}-1$) for the fourth subframe. The indexing of the ECCEs used for the second EPDCCH may be defined as 0 to ($N_{ECCE2}-1$) for the first subframe, $N_{ECCE2}$ to $2N_{ECCE2}-1$) for the second subframe, ($2N_{ECCE2}$) to ($3N_{ECCE2}-1$) for the third subframe, and $3N_{ECCE2}$ to ($4N_{ECCE2}-1$) for the fourth subframe.

Figure 10:
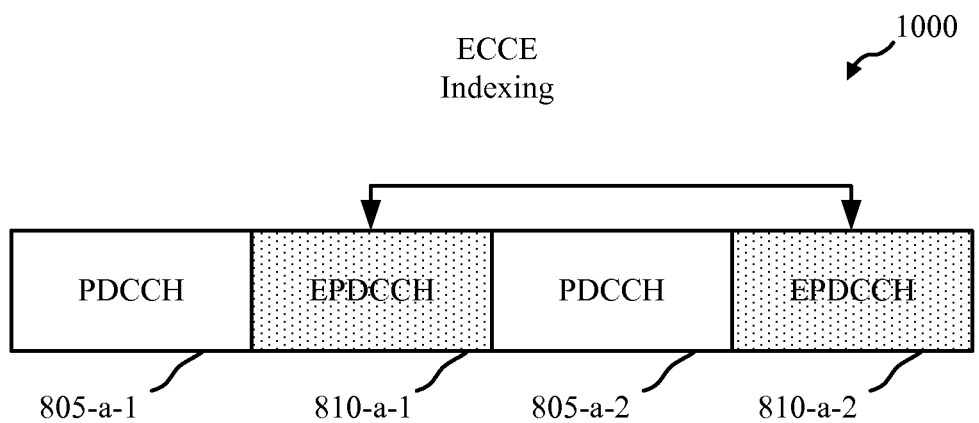
FIG. 10 illustrates another example of ECCE indexing.

In another example, ECCE indexing may be based on the actual subframes that the UE 115 monitors EPDCCH within the association set. For example, FIG. 10 illustrates an example ECCE indexing 1000 defined based on the actual subframes configured for EPDCCH (i.e., the second subframe 810-*a*-1 and the fourth subframe 810-*a*-2 in the association set.) This may be referred to as a selective indexing, where the subframes are not contiguous in time.

Figure 11:
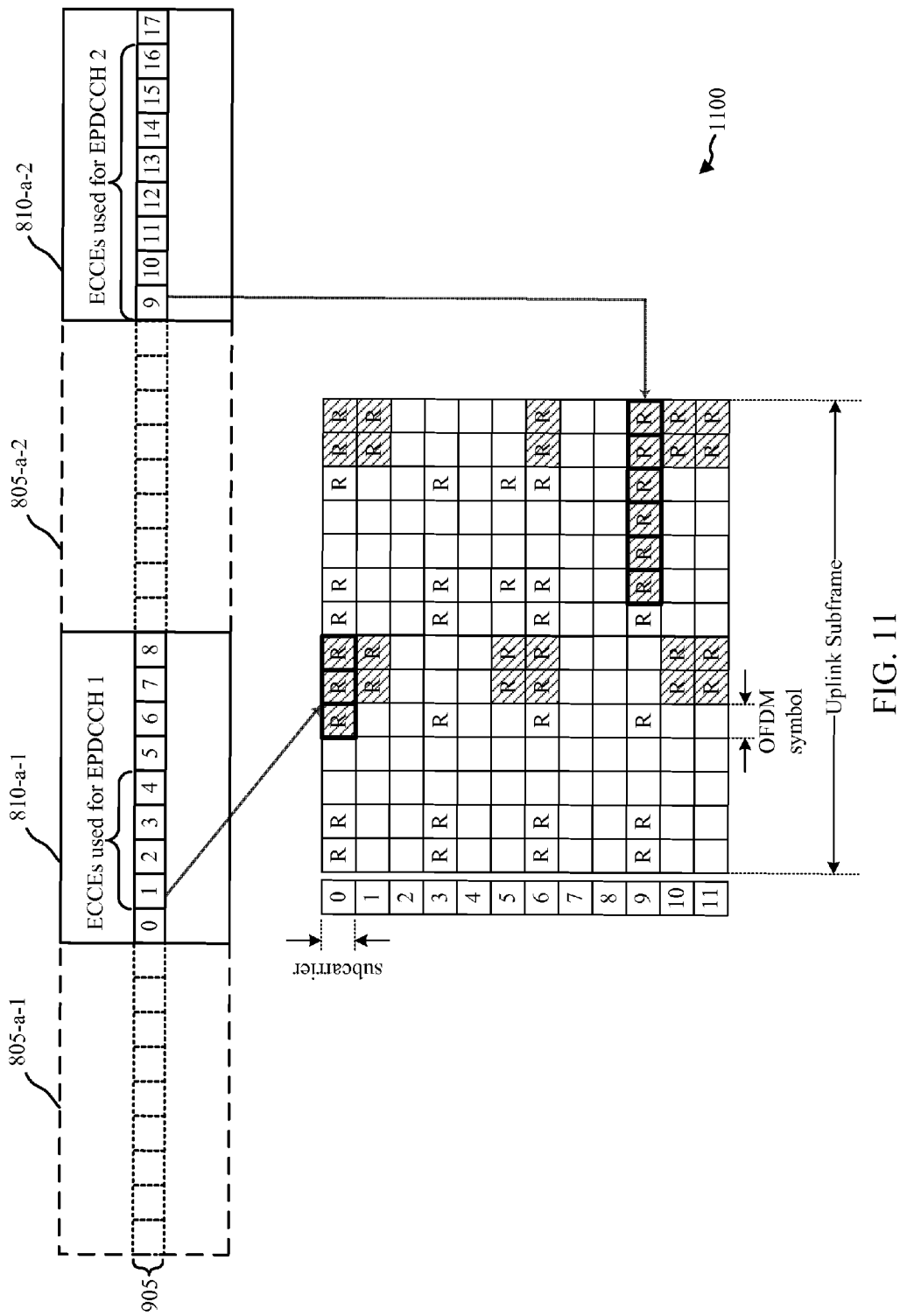
FIG. 11 is a block diagram illustrating one embodiment of selective ECCE indexing.

FIG. 11 is a block diagram 1100 illustrating one embodiment of selective ECCE indexing. Subframes of an association set of downlink subframes may be configured for either PDCCH messages or EPDCCH messages. In one configuration, a first subframe 805-*a*-1 and a third subframe 805-*a*-2 may not be configured for EPDCCH messages. Instead, these subframes may be configured for PDCCH messages. However, the second subframe 810-*a*-1 and the fourth subframe 810-*a*-2 may be configured for EPDCCH (but may not be configured PDCCH).

In one example, ECCEs 905 used for EPDCCH messages may be indexed across the subframes that are configured for EPDCCH. As a result, indexing of ECCEs is not performed in the first subframe 805-*a*-1 (which is not configured for EPDCCH), the ECCE indexing in the second subframe 810-*a*-1 (which is configured for EPDCCH) is 0-8, ECCE indexing in the third subframe 805-*a*-2 (which is not configured for EPDCCH) is not performed, and the ECCE indexing in the fourth subframe 810-*a*-2 (which is configured for EPDCCH) may be 9-17.

When a UE 115 detects EPDCCH in a subframe, the index of the ECCEs used for that detected EPDCCH may be used to identify uplink channel resources. The identified uplink channel resources may be used to transmit ACK/NACK information in an uplink subframe. For example, a first EPDCCH may be detected in the second subframe 810-*a*-1. The index of the ECCEs used for the first EPDCCH may be used to map to uplink resources in an uplink subframe. These uplink resources may then be used to transmit the ACK/NACK in the uplink to the eNB. Further, a second EPDCCH may be detected in the fourth subframe 810-*a*-2. The index of the ECCEs used for this second EPDCCH may be used to identify the uplink channel resources to use for HARQ feedback information (e.g., ACK/NACK information) in the uplink. As illustrated, the indexing of the ECCEs may be defined by each subframe in the association set, even if a particular subframe (e.g., the first subframe 805-*a*-1 and the third subframe 805-*a*-2) are not configured for EPDCCH.

While only one EPDCCH resource set is illustrated being detected in the second and fourth subframes, it is to be understood that more than one EPDCCH resource set may be detected in a single subframe. The indexing of ECCEs for each of the detected EPDCCHs in a particular subframe may be separate from each other. In one embodiment, the number of ECCEs ($N_{ECCE1}$) used for a first EPDCCH may be different than the number of ECCEs ($N_{ECCE2}$) used for a second EPDCCH detected during the same subframe. The indexing of the ECCEs used for the first EPDCCH may be defined as 0 to ($N_{ECCE1}$-1) for the second subframe, and $N_{ECCE1}$ to ($2N_{ECCE1}$-1) for the fourth subframe. The indexing of the ECCEs used for the second EPDCCH may be defined as 0 to ($N_{ECCE2}$-1) for the second subframe, and $N_{ECCE2}$ to $2N_{ECCE2}$-1) for the fourth subframe.

In one example, the subframes used in the determination of ECCE indexing (and for subsequent identification of PUCCH resources) may be based on a configuration by higher layer signaling. For instance, RRC signaling may indicate which subframes a UE should monitor for EPDCCH messages. Depending upon device configuration, a UE may skip monitoring in one or more of its configured subframes. For example, the UE may skip monitoring in one or more of its EPDCCH subframes which coincide with a configured measurement gap. Likewise, a UE configured for discontinuous reception (DRX) may not monitor one or more EPDCCH subframes in an association set which coincide with its sleep cycle. Monitoring of subframes may also be skipped in the event of a collision with MBMS subframes, etc.

One approach for dealing with the possibility of skipped subframes is to base the ECCE index determination on the higher layer configuration only. In this case, the UE bases its determination of ECCE indexing upon all configured EPDCCH subframes regardless of whether it actually monitors EPDCCH in each subframe. This may be advantageous from the standpoint of simplifying device operation given complex and possibly changing device configurations. Also, it creates a cell-specific approach that may simplify PUCCH management. Alternatively, skipped subframes can be excluded from ECCE indexing. With this approach, only those subframes in the configured set which were actually monitored by the UE are used for ECCE indexing. Although more complex, this device-specific approach may permit greater flexibility and/or more efficient uplink resource utilization. The handling of skipped subframes with ECCE indexing may be fixed (e.g., it may be hard coded) or it may change from time to time (e.g., it may be signaled to device). In addition, whether to include or exclude skipped subframes in ECCE indexing may depend upon the reason for not monitoring a subframe. For example, EPDCCH subframes not monitored due to MBMS subframes may be excluded from ECCE indexing whereas subframes skipped for other purposes may be included.

Figure 12:
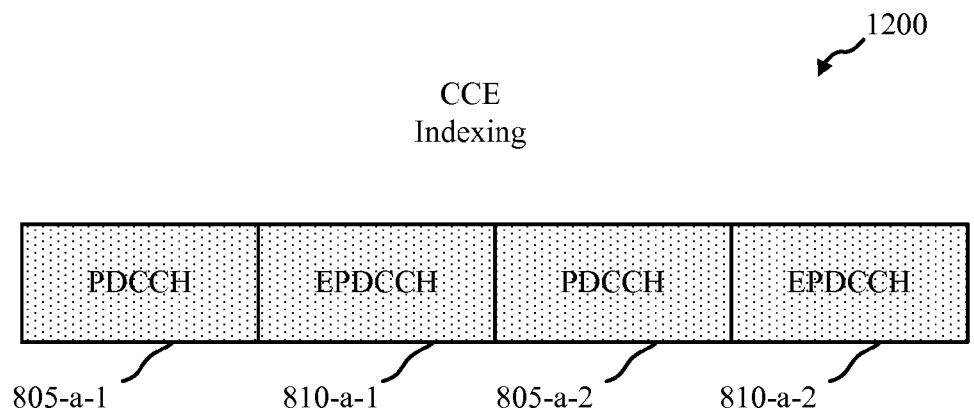
FIGS. 12 and 13 illustrate examples of CCE indexing.

Turning to CCE indexing, in one example CCE indexing may be based on the total number of subframes within the same association set of M, regardless of the actual subframes that UE monitors PDCCH within the association set. For example, FIG. 12 illustrates an example CCE indexing defined based on all four subframes in the association set, even if PDCCH is monitored only on the first subframe 805-*a*-1 and the third subframe 805-*a*-2 in the association set. This may be referred to as continuous indexing, where the subframes are contiguous in time.

Figure 13:
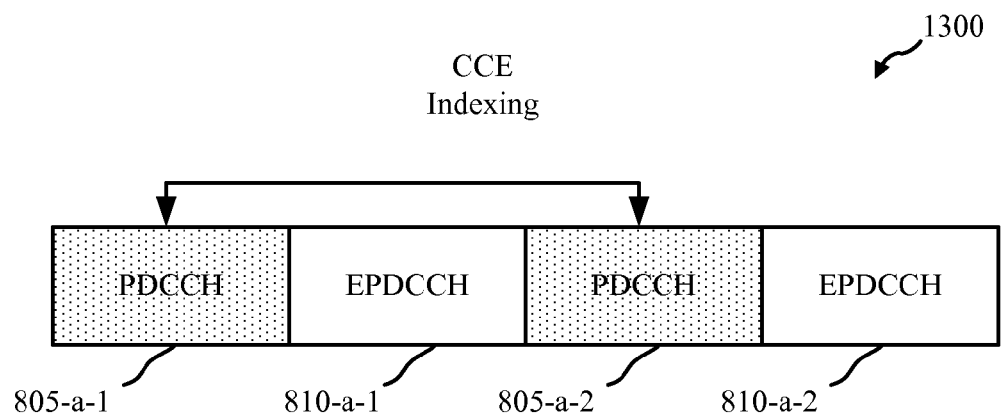

In another example, CCE indexing may be based on the actual subframes where UE monitors PDCCH. For example, FIG. 13 illustrates an example CCE indexing defined based on the two subframes, the first subframe 805-*a*-1 and the third subframe 805-*a*-2, where PDCCH is monitored. This may be referred to as selective indexing, where the subframes are not contiguous in time.

It is worth noting that same or different alternatives may be selected for ECCE and CCE indexing (e.g., ECCE uses selective, CCE uses continuous). This type of indexing may be applied regardless of how CCE indexing is defined across different subframes in the association set. The subset for EPDCCH or PDCCH subframes for ECCE indexing or CCE indexing can be also signaled in RRC, explicitly in a specification, or a combination thereof. Thus, the index may be stored, in whole or in part, locally at the UE. The UE may, therefore, receive index information from the eNB, have the indexing hard coded, or any combination thereof.

Figure 14:
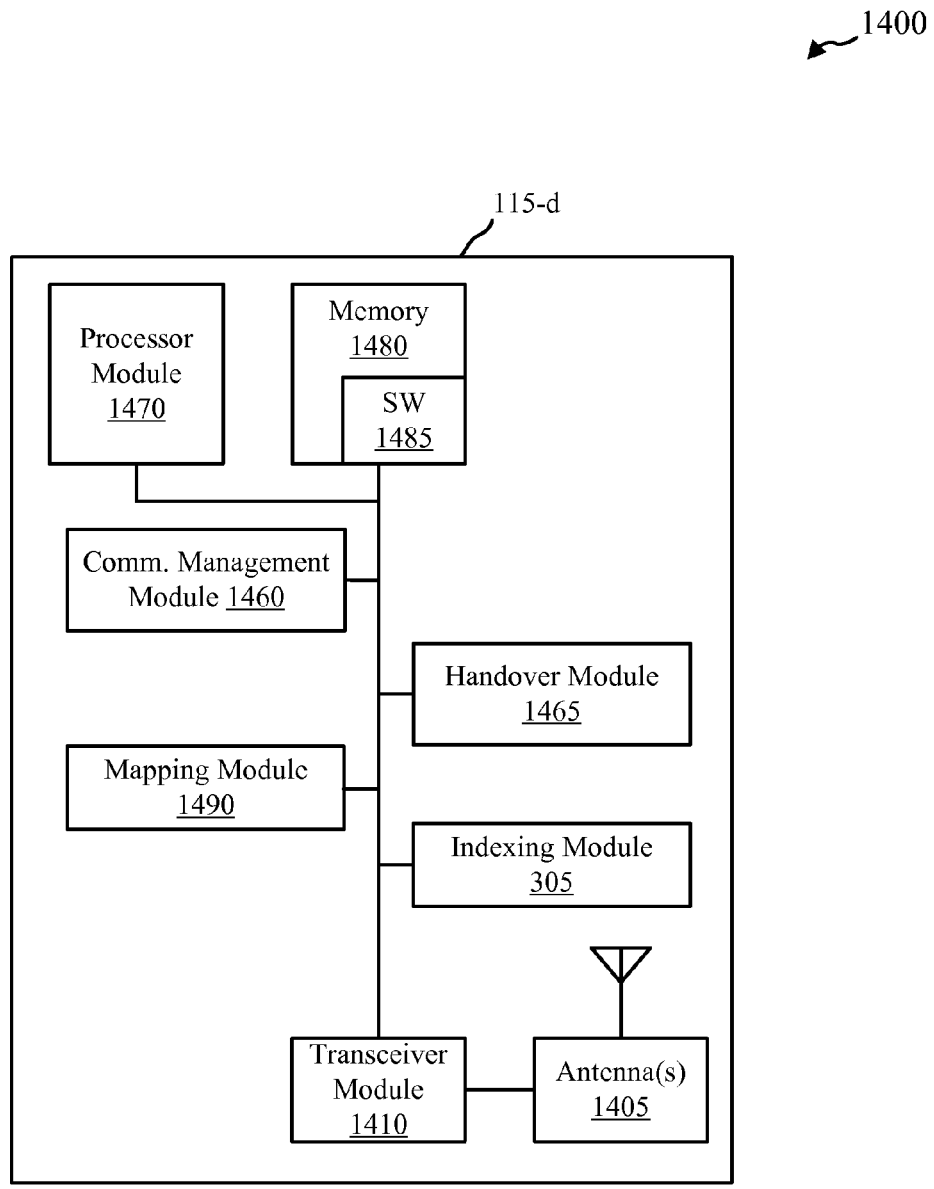
FIG. 14 is a block diagram of a user equipment configured for ECCE indexing to determine physical uplink control channel (PUCCH) resources in accordance with various embodiments.

FIG. 14 is a block diagram 1400 of a UE 115-*d* configured for ECCE indexing to determine PUCCH resources in accordance with various embodiments. The UE 115-*d* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-*f* may have an internal power supply (not shown), such as a small battery, to facilitate mobile operation. In some embodiments, the UE 115-*d* may be the UEs 115 of FIGS. 1, 2, 3, and/or 4.

The UE 115-*d* may generally include components for bi-directional communications including components for transmitting communications and components for receiving communications. The UE 115-*d* may include a transceiver module 1410, and antenna(s) 1405, which each may communicate, directly or indirectly, with each other (e.g., via one or more buses). The transceiver module 1410 is configured to communicate bi-directionally, via the antenna(s) 1405 and/or one or more wired or wireless links, with one or more networks, as described above. For example, the transceiver module 1410 may be configured to communicate bi-directionally with base stations 105 of FIGS. 1, 2, 3, and 4. The transceiver module 1410 may include a modem configured to modulate the packets and provide the modulated packets to the antenna(s) 1405 for transmission, and to demodulate packets received from the antenna(s) 1405. While the mobile device 115-*d* may include a single antenna 1405, the mobile device 115-*d* may have multiple antennas 1405 capable of concurrently transmitting and/or receiving multiple wireless transmissions.

The memory 1480 may include random access memory (RAM) and read-only memory (ROM). The memory 1480 may store computer-readable, computer-executable software/firmware code 1485 containing instructions that are configured to, when executed, cause the processor module 1470 to perform various functions described herein (e.g., call processing, database management, message routing, etc.). Alternatively, the software/firmware code 1485 may not be directly executable by the processor module 1470 but be configured to cause a computer (e.g., when compiled and executed) to perform functions described herein.

The processor module 1470 may include an intelligent hardware device, e.g., a central processing unit (CPU) such as those made by Intel® Corporation or AMD®, a microcontroller, an application-specific integrated circuit (ASIC), etc. The processor module 1470 may perform any of the features described above with reference to FIGS. 8, 9, 10, 11, 12, and/or 13 or elsewhere herein. The UE 115-*d* may include a speech encoder (not shown) configured to receive audio via a microphone, convert the audio into packets (e.g., 20 ms in length, 30 ms in length, etc.) representative of the received audio, provide the audio packets to the transceiver module 1410, and provide indications of whether a user is speaking. Alternatively, the voice encoder may only provide packets to the transceiver module 1410, with the provision or withholding/suppression of the packet itself providing the indication of whether a user is speaking.

According to the architecture of FIG. 14, the mobile device 115-*d* may further include a communications management module 1460. The communications management module 1460 may manage communications with other mobile devices 115. By way of example, the communications management module 1460 may be a component of the mobile device 115-*d* in communication with some or all of the other components of the mobile device 115-*d* via a bus. Alternatively, functionality of the communications management module 1460 may be implemented as a component of the transceiver module 1410, as a computer program product, and/or as one or more controller elements of the processor module 1470.

In some embodiments, a handover module 1465 may be utilized to perform handover procedures of the mobile device 115-*d* from one base station to another. For example, the handover module 1465 may perform a handover procedure of the mobile device 115-*d* from one base station to another where voice communications are being received from the base stations.

The mobile device 115-*d* may further include an indexing module 305 and a mapping module 1490. The indexing module 305 may index ECCEs and CCEs as previously described. The mapping module 1490 may use the ECCE index or the CCE index to identify an uplink channel resources to use to transmit HARQ feedback information, such as an ACK/NACK indicator to a base station 105. The HARQ feedback information may be transmitted in an uplink subframe that is common to an association set of downlink subframes.

Figure 15:
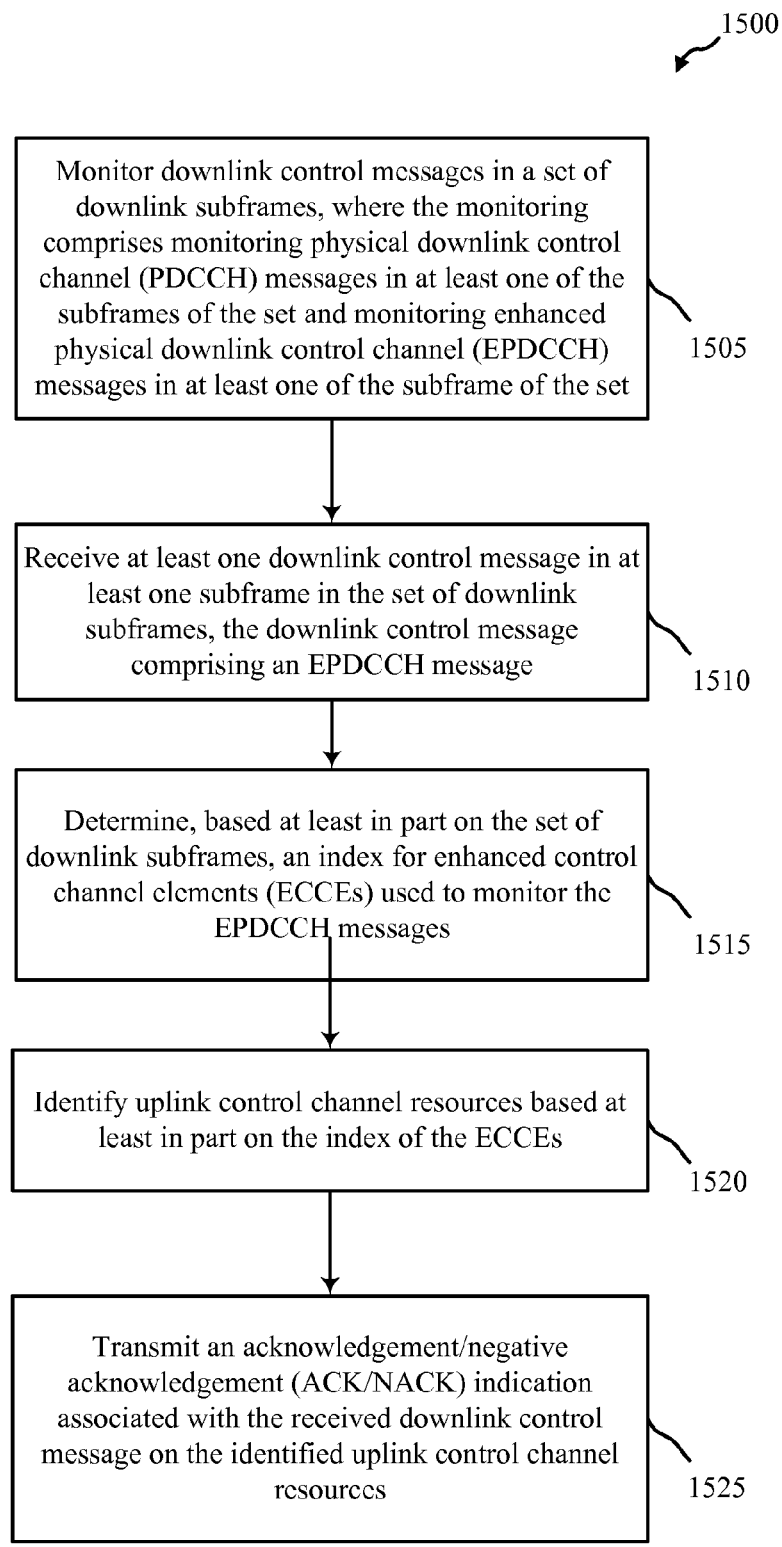
FIG. 15 is a flow diagram of a method for managing wireless communication in accordance with various embodiments.

Turning to FIG. 15, a flow diagram of a method 1500 for managing wireless communication is illustrated in accordance with various embodiments. Method 1500 may be implemented utilizing various wireless communications devices including, but not limited to eNBs 105 as seen in FIGS. 1, 2, 3, and/or 4, and/or device 115 as seen in FIGS. 1, 2, 3, 4, and/or 14.

Method 1500 may begin at block 1505 where downlink control messages are monitored in a set of downlink subframes. The monitoring may include monitoring physical downlink control channel (PDCCH) messages in at least one of the subframes of the set and monitoring enhanced physical downlink control channel (EPDCCH) messages in at least one of the subframe of the set.

At block 1510, at least one downlink control message may be received in at least one subframe in the set of downlink subframes. The downlink control message may include an EPDCCH message. At block 1415, an index for enhanced control channel elements (ECCEs) is determined based at least in part on the set of downlink subframes. The ECCEs may be used to monitor the EPDCCH messages. At block 1520, uplink control channel resources may be identified based at least in part on the index of the ECCEs. At block 1525, an acknowledgement/negative acknowledgement (ACK/NACK) indication for the received downlink control message may be transmitted. The ACK/NACK indication may be transmitted on the identified uplink control channel resources.

Therefore, the method 1500 may provide for managing wireless communications by indexing ECCEs to identify uplink channel resources for HARQ feedback information. It should be noted that the method 1500 is just one implementation and that the operations of the method 1500 may be rearranged or otherwise modified such that other implementations are possible.

Figure 16:
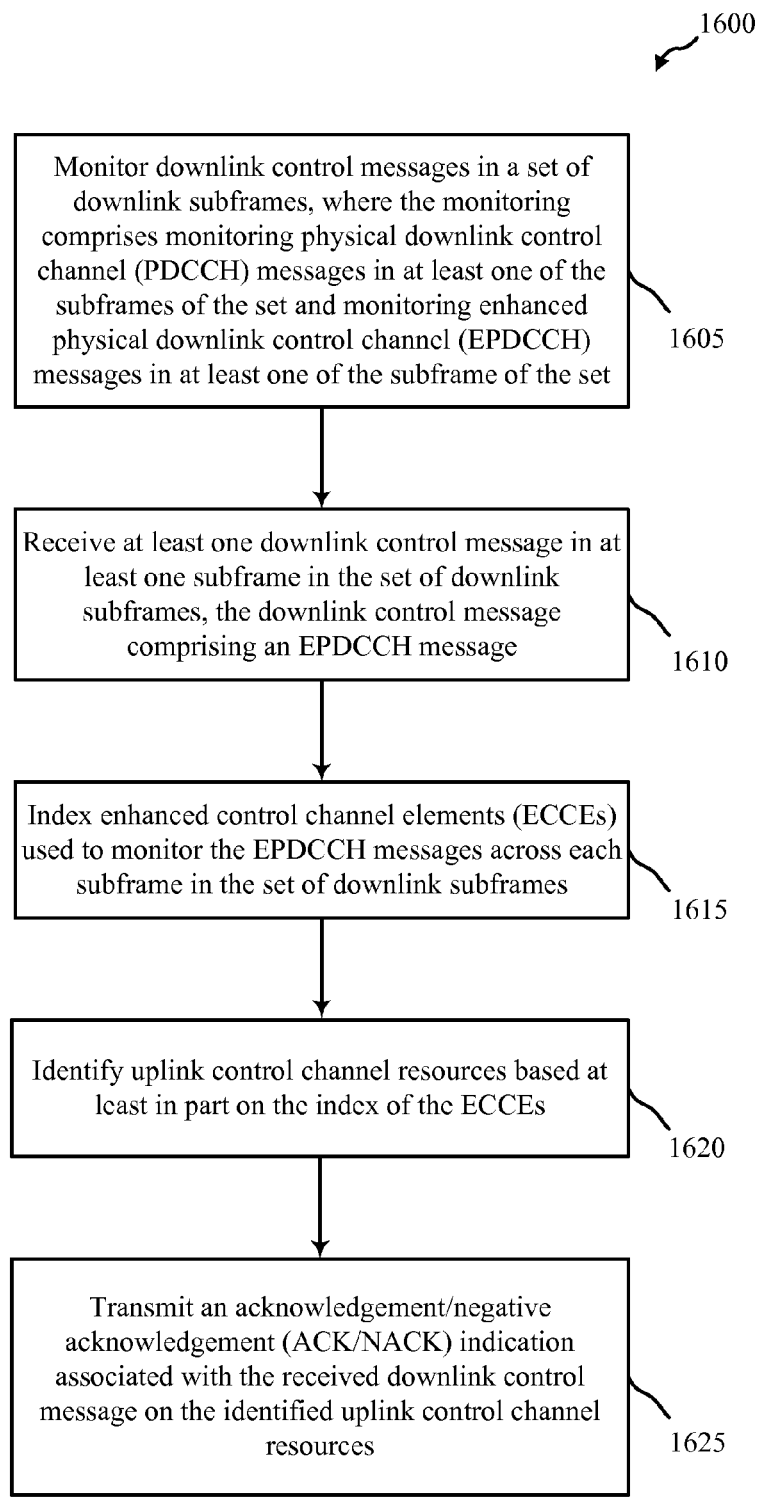
FIG. 16 is a flow diagram of a method for managing wireless communication by performing continuous indexing of ECCEs in accordance with various embodiments.

FIG. 16 is a flow diagram of a method 1600 for managing wireless communication by performing continuous indexing of ECCEs in accordance with various embodiments. Method 1600 may be implemented utilizing various wireless communications devices including, but not limited to eNBs 105 as seen in FIGS. 1, 2, 3, and/or 4, and/or device 115 as seen in FIGS. 1, 2, 3, 4, and/or 14.

Method 1600 may begin at block 1605 where downlink control messages are monitored in a set of downlink subframes. The monitoring may include monitoring PDCCH messages in at least one of the subframes of the set and monitoring EPDCCH messages in at least one of the subframe of the set.

At block 1610, at least one downlink control message may be received in at least one subframe in the set of downlink subframes. The downlink control message may include an EPDCCH message. At block 1615, ECCEs used to monitor the EPDCCH messages may be indexed. The ECCEs may be indexed across each subframe in the set of downlink subframes. In one example, an index value may be incremented for each ECCE in the subframes of the set.

At block 1620, uplink control channel resources may be identified based at least in part on the index of the ECCEs. At block 1625, an ACK/NACK indication for the received downlink control message may be transmitted. The ACK/NACK indication may be transmitted on the identified uplink control channel resources.

Therefore, the method 1600 may provide for managing wireless communications by indexing ECCEs in each subframe of a set of downlink subframes regardless of whether a subframe is configured to monitor for EPDCCH. It should be noted that the method 1600 is just one implementation and that the operations of the method 1600 may be rearranged or otherwise modified such that other implementations are possible.

Figure 17:
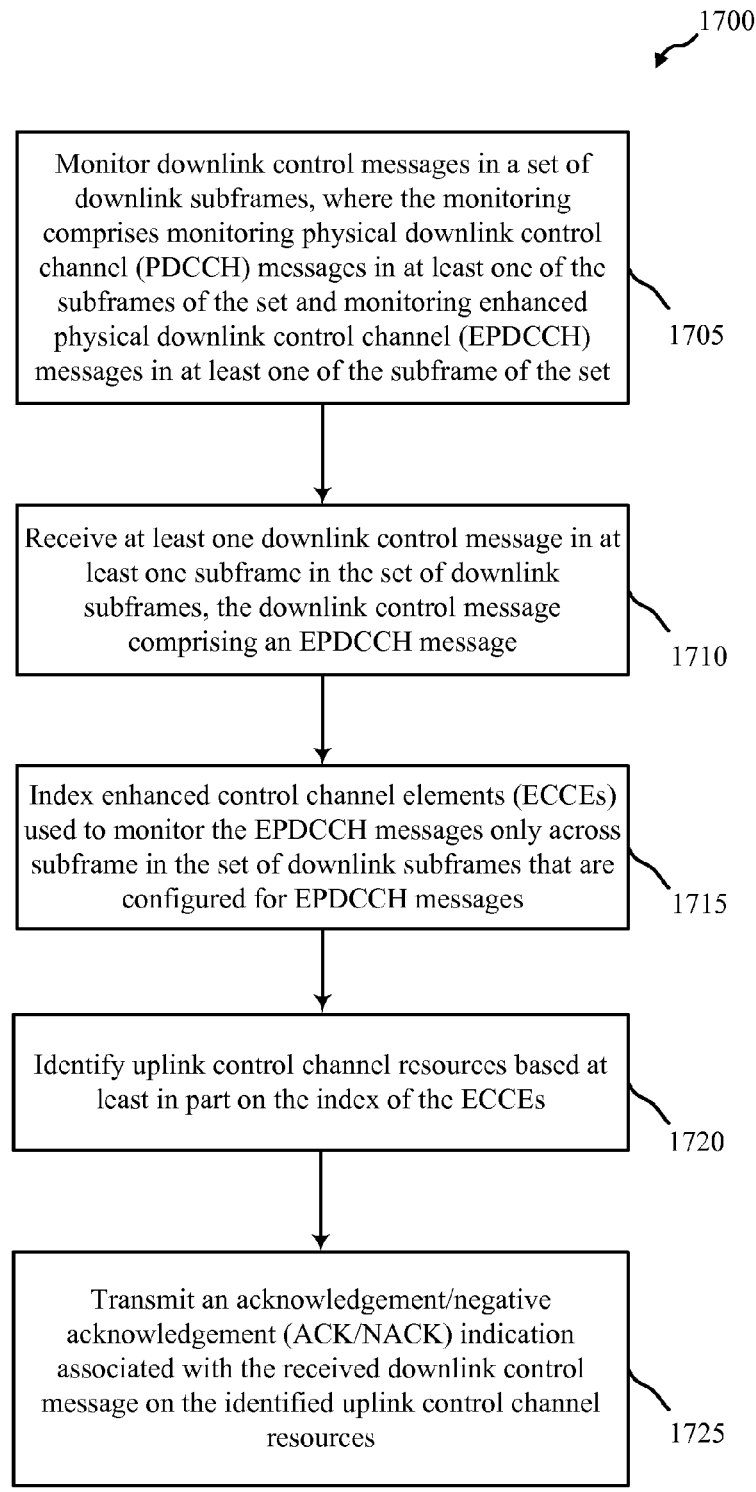
FIG. 17 is a flow diagram of a method for managing wireless communication by performing selective indexing of ECCEs in accordance with various embodiments.

FIG. 17 is a flow diagram of a method 1700 for managing wireless communication by performing selective indexing of ECCEs in accordance with various embodiments. Method 1700 may be implemented utilizing various wireless communications devices including, but not limited to eNBs 105 as seen in FIGS. 1, 2, 3, and/or 4, and/or device 115 as seen in FIGS. 1, 2, 3, 4, and/or 14.

Method 1700 may begin at block 1705 where downlink control messages are monitored in a set of downlink subframes. The monitoring may include monitoring PDCCH messages in at least one of the subframes of the set and monitoring EPDCCH messages in at least one of the subframe of the set.

At block 1710, at least one downlink control message may be received in at least one subframe in the set of downlink subframes. The downlink control message may include an EPDCCH message. At block 1715, ECCEs used to monitor the EPDCCH messages may be indexed. The ECCEs may be indexed across subframes in the set of downlink subframes that are configured for EPDCCH messages. ECCEs may not be indexed in subframes of the set that are not configured for EPDCCH. In one example, an index value may be incremented for each ECCE in the subframes of the set that are configured for EPDCCH.

At block 1720, uplink control channel resources may be identified based at least in part on the index of the ECCEs. At block 1725, an ACK/NACK indication for the received downlink control message may be transmitted. The ACK/NACK indication may be transmitted on the identified uplink control channel resources.

Therefore, the method 1700 may provide for managing wireless communications by indexing ECCEs in subframes of a set of downlink subframes that are configured to monitor for EPDCCH. It should be noted that the method 1700 is just one implementation and that the operations of the method 1700 may be rearranged or otherwise modified such that other implementations are possible.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method of indexing control channel elements in wireless communications, comprising:
monitoring for downlink control messages in a set of downlink subframes, wherein at least one subframe in the set of downlink subframes is configured for physical downlink control channel (PDCCH) messages and at least one subframe in the set of downlink subframes is configured for enhanced physical downlink control channel (EPDCCH) messages;
indexing enhanced control channel elements (ECCEs) across each subframe in the set of downlink subframes, wherein the ECCEs are indexed in a continuous manner across each subframe in the set of downlink subframes including subframes for which PDCCH is monitored and subframes for which EPDCCH is monitored, and wherein the ECCE indexing is based on a total number of subframes in the set of downlink subframes;
receiving a downlink control message in at least one subframe in the set of downlink subframes, the downlink control message comprising an EPDCCH message;
determining an ECCE index associated with the received downlink control message comprising the EPDCCH message;
identifying uplink control channel resources based at least in part on the determined ECCE index; and
transmitting an acknowledgement/negative acknowledgement (ACK/NACK) indication associated with the received downlink control message comprising the EPDCCH message on the identified uplink control channel resources.

2. The method of claim 1, wherein the transmitting the ACK/NACK indication comprises:
transmitting the ACK/NACK indication in a single uplink subframe, the single uplink subframe being a common uplink subframe for each of the subframes in the set of downlink subframes.

3. The method of claim 1, wherein indexing the ECCEs comprises:
incrementing an index value for each ECCE within a subframe of the set of downlink subframes.

4. The method of claim 3, wherein the index value is incremented in each subframe in the set of downlink subframes such that a first ECCE of a subsequent subframe is incremented with respect to a last ECCE of a preceding subframe.

5. The method of claim 1, further comprising:
receiving a configuration for a plurality of EPDCCH resource sets, each EPDCCH resource set comprising two or more physical resource block (PRB) pairs, wherein indexing the ECCEs comprises indexing the ECCEs associated with each EPDCCH resource set separately.

6. The method of claim 1, wherein each subframe in the set of downlink subframes comprises one of the PDCCH messages or the EPDCCH messages.

7. The method of claim 1, further comprising:
indexing control channel elements (CCEs) across each subframe in the set of downlink subframes, wherein the CCEs are indexed in a continuous manner across each subframe in the set of downlink subframes;
receiving a downlink control message in at least one subframe in the set of downlink subframes, the downlink control message comprising a PDCCH message;
determining a CCE index associated with the received downlink control message comprising the PDCCH message;
identifying uplink control channel resources based at least in part on the determined CCE index; and
transmitting an ACK/NACK indication for the received downlink control message comprising the PDCCH message on the identified uplink control channel resources.

8. The method of claim 7, wherein the CCE indexing is based upon a total number of subframes in the set of downlink subframes.

9. The method of claim 1, further comprising:
identifying an ECCE index associated with each EPDCCH message.

10. The method of claim 9, wherein each of the subframes in the set of downlink subframes are contiguous downlink subframes.

11. The method of claim 1, wherein the wireless communications are performed in a wireless communication system that comprises a time division duplexed (TDD) long term evolution (LTE) system.

12. The method of claim 11, wherein the number of subframes in the set of downlink subframes depends at least in part on a downlink and uplink subframe configuration specified for the TDD LTE system.

13. The method of claim 1, wherein the downlink control message comprises a downlink control information (DCI) message.

14. The method of claim 1, wherein the EPDCCH messages are monitored in a search space specific to the mobile device.

15. The method of claim 1, wherein the EPDCCH messages are monitored in a search space common to two or more mobile devices.

16. The method of claim 1, wherein each subframe in the set of downlink subframes comprises an EPDCCH message.

17. An apparatus for indexing control channel elements in wireless communications, comprising:
means for monitoring for downlink control messages in a set of downlink subframes, wherein at least one subframe in the set of downlink subframes is configured for physical downlink control channel (PDCCH) messages and at least one subframe in the set of downlink subframes is configured for enhanced physical downlink control channel (EPDCCH) messages;
means for indexing enhanced control channel elements (ECCEs) across each subframe in the set of downlink subframes, wherein the ECCEs are indexed in a continuous manner across each subframe in the set of downlink subframes including subframes for which PDCCH is monitored and subframes for which EPDCCH is monitored, and wherein the ECCE indexing is based on a total number of subframes in the set of downlink subframes;
means for receiving a downlink control message in at least one subframe in the set of downlink subframes, the downlink control message comprising an EPDCCH message;
means for determining an ECCE index associated with the received downlink control message comprising the EPDCCH message;
means for identifying uplink control channel resources based at least in part on the determined ECCE index; and
means for transmitting an acknowledgement/negative acknowledgement (ACK/NACK) indication associated with the received downlink control message comprising the EPDCCH message on the identified uplink control channel resources.

18. The apparatus of claim 17, wherein the means for transmitting the ACK/NACK indication comprises:
 means for transmitting the ACK/NACK indication in a single uplink subframe, the single uplink subframe being a common uplink subframe for each of the subframes in the set of downlink subframes.

19. The apparatus of claim 17, wherein the means for indexing the ECCEs comprises:
 means for incrementing an index value for each ECCE within a subframe of the set of downlink subframes.

20. The apparatus of claim 19, wherein the index value is incremented in each subframe in the set of downlink subframes such that a first ECCE of a subsequent subframe is incremented with respect to a last ECCE of a preceding subframe.

21. The apparatus of claim 17, further comprising:
 means for receiving a configuration for a plurality of EPDCCH resource sets, each EPDCCH resource set comprising two or more physical resource block (PRB) pairs, wherein the means for indexing the ECCEs indexes the ECCEs associated with each EPDCCH resource set separately.

22. The apparatus of claim 17, wherein each subframe in the set of downlink subframes comprises one of the PDCCH messages or the EPDCCH messages.

23. The apparatus of claim 17, wherein each subframe in the set of downlink subframes comprises an EPDCCH message.

24. The apparatus of claim 17, further comprising:
 means for indexing control channel elements (CCEs) across each subframe in the set of downlink subframes, wherein the CCEs are indexed in a continuous manner across each subframe in the set of downlink subframes;
 means for receiving a downlink control message in at least one subframe in the set of downlink subframes, the downlink control message comprising a PDCCH message;
 means for determining a CCE index associated with the received downlink control message comprising the PDCCH message;
 means for identifying uplink control channel resources based at least in part on the determined CCE index; and
 means for transmitting an ACK/NACK indication for the received downlink control message comprising the PDCCH message on the identified uplink control channel resources.

25. The apparatus of claim 24, wherein the CCE indexing is based upon a total number of subframes in the set of downlink subframes.

26. The apparatus of claim 17, further comprising:
 means for identifying an ECCE index associated with each EPDCCH message.

27. The apparatus of claim 26, wherein each of the subframes in the set of downlink subframes are contiguous downlink subframes.

28. The apparatus of claim 17, wherein the wireless communications are performed in a wireless communication system that comprises a time division duplexed (TDD) long term evolution (LTE) system.

29. The apparatus of claim 28, wherein the number of subframes in the set of downlink subframes depends at least in part on a downlink and uplink subframe configuration specified for the TDD LTE system.

30. The apparatus of claim 17, wherein the downlink control message comprises a downlink control information (DCI) message.

31. The apparatus of claim 17, wherein the EPDCCH messages are monitored in a search space specific to the mobile device.

32. The apparatus of claim 17, wherein the EPDCCH messages are monitored in a search space common to two or more mobile devices.

33. An apparatus for indexing control channel elements in wireless communications, comprising:
 a processor;
 memory in electronic communication with the processor; and
 instructions stored in the memory, the instructions being executable by the processor to cause the apparatus to:
  monitor for downlink control messages in a set of downlink subframes, wherein at least one subframe in the set of downlink subframes is configured for physical downlink control channel (PDCCH) messages and at least one subframe in the set of downlink subframes is configured for enhanced physical downlink control channel (EPDCCH) messages;
  index enhanced control channel elements (ECCEs) across each subframe in the set of downlink subframes, wherein the ECCEs are indexed in a continuous manner across each subframe in the set of downlink subframes including subframes for which PDCCH is monitored and subframes for which EPDCCH is monitored, and wherein the ECCE indexing is based on a total number of subframes in the set of downlink subframes;
  receive a downlink control message in at least one subframe in the set of downlink subframes, the downlink control message comprising an EPDCCH message;
  determine an ECCE index associated with the received downlink control message comprising the EPDCCH message;
  identify uplink control channel resources based at least in part on the determined ECCE index; and
  transmit an acknowledgement/negative acknowledgement (ACK/NACK) indication associated with the received downlink control message comprising the EPDCCH message on the identified uplink control channel resources.

34. The apparatus of claim 33, wherein the instructions for transmitting the ACK/NACK indication are executable by the processor to cause the apparatus to:
 transmit the ACK/NACK indication in a single uplink subframe, the single uplink subframe being a common uplink subframe for each of the subframes in the set of downlink subframes.

35. The apparatus of claim 33, wherein the instructions for indexing the ECCEs are executable by the processor to cause the apparatus to:
 increment an index value for each ECCE within a subframe of the set of downlink subframes.

36. The apparatus of claim 35, wherein the index value is incremented in each subframe in the set of downlink subframes such that a first ECCE of a subsequent subframe is incremented with respect to a last ECCE of a preceding subframe.

37. The apparatus of claim 33, wherein the instructions are executable by the processor to cause the apparatus to:
 receive a configuration for a plurality of EPDCCH resource sets, each EPDCCH resource set comprising two or more physical resource block (PRB) pairs, wherein the instructions for indexing the ECCEs are executable by the processor to index the ECCEs associated with each EPDCCH resource set separately.

38. The apparatus of claim 33, wherein each subframe in the set of downlink subframes comprises one of the PDCCH messages or the EPDCCH messages.

39. The apparatus of claim 33, wherein each subframe in the set of downlink subframes comprises an EPDCCH message.

40. The apparatus of claim 33, wherein the instructions are executable by the processor to:
  index control channel elements (CCEs) across each subframe in the set of downlink subframes, wherein the CCEs are indexed in a continuous manner across each subframe in the set of downlink subframes;
  receive a downlink control message in at least one subframe in the set of downlink subframes, the downlink control message comprising a PDCCH message;
  determine a CCE index associated with the received downlink control message comprising the PDCCH message;
  identify uplink control channel resources based at least in part on the determined CCE index; and
  transmit an ACK/NACK indication for the received downlink control message comprising the PDCCH message on the identified uplink control channel resources.

41. The apparatus of claim 40 wherein the CCE indexing is based upon a total number of subframes in the set of downlink subframes.

42. The apparatus of claim 33, wherein the instructions are executable by the processor to cause the apparatus to:
  identify an ECCE index associated with each EPDCCH message.

43. The apparatus of claim 42, wherein each of the subframes in the set of downlink subframes are contiguous downlink subframes.

44. The apparatus of claim 33, wherein the wireless communications are performed in a wireless communication system that comprises a time division duplexed (TDD) long term evolution (LTE) system.

45. The apparatus of claim 44, wherein the number of subframes in the set of downlink subframes depends at least in part on a downlink and uplink subframe configuration specified for the TDD LTE system.

46. The apparatus of claim 33, wherein the downlink control message comprises a downlink control information (DCI) message.

47. The apparatus of claim 33, wherein the EPDCCH messages are monitored in a search space specific to the mobile device.

48. The apparatus of claim 33, wherein the EPDCCH messages are monitored in a search space common to two or more mobile devices.

49. A non-transitory computer-readable medium storing code for wireless communications, the code comprising instructions executable by a processor to:
  monitor for downlink control messages in a set of downlink subframes, wherein at least one subframe in the set of downlink subframes is configured for physical downlink control channel (PDCCH) messages and at least one subframe in the set of downlink subframes is configured for enhanced physical downlink control channel (EPDCCH) messages;
  index enhanced control channel elements (ECCEs) across each subframe in the set of downlink subframes, wherein the ECCEs are indexed in a continuous manner across each subframe in the set of downlink subframes including subframes for which PDCCH is monitored and subframes for which EPDCCH is monitored, and wherein the ECCE indexing is based on a total number of subframes in the set of downlink subframes;
  receive a downlink control message in at least one subframe in the set of downlink subframes, the downlink control message comprising an EPDCCH message;
  determine an ECCE index associated with the received downlink control message comprising the EPDCCH message;
  identify uplink control channel resources based at least in part on the determined ECCE index; and
  transmit an acknowledgement/negative acknowledgement (ACK/NACK) indication associated with the received downlink control message comprising the EPDCCH message on the identified uplink control channel resources.

50. The non-transitory computer-readable medium of claim 49, wherein the instructions for transmitting the ACK/NACK indication are executable by the processor to:
  transmit the ACK/NACK indication in a single uplink subframe, the single uplink subframe being a common uplink subframe for each of the subframes in the set of downlink subframes.

51. The non-transitory computer-readable medium of claim 49, wherein the instructions for indexing the ECCEs are executable by the processor to:
  increment an index value for each ECCE within a subframe of the set of downlink subframes.

52. The non-transitory computer-readable medium of claim 49, wherein the instructions are executable by the processor to:
  receive a configuration for a plurality of EPDCCH resource sets, each EPDCCH resource set comprising two or more physical resource block (PRB) pairs, wherein the instructions for indexing the ECCEs are executable by the processor to index the ECCEs associated with each EPDCCH resource set separately.

53. The non-transitory computer-readable medium of claim 49, wherein each subframe in the set of downlink subframes comprises one of the PDCCH messages or the EPDCCH messages.

54. The non-transitory computer-readable medium of claim 49, wherein each subframe in the set of downlink subframes comprises an EPDCCH message.

55. The non-transitory computer-readable medium of claim 49, wherein the instructions are executable by the processor to:
  index control channel elements (CCEs) across each subframe in the set of downlink subframes, wherein the CCEs are indexed in a continuous manner across each subframe in the set of downlink subframes;
  receive a downlink control message in at least one subframe in the set of downlink subframes, the downlink control message comprising a PDCCH message;
  determine a CCE index associated with the received downlink control message comprising the PDCCH message;
  identify uplink control channel resources based at least in part on the determined CCE index; and
  transmit an ACK/NACK indication for the received downlink control message comprising the PDCCH message on the identified uplink control channel resources.

56. The non-transitory computer-readable medium of claim 49, wherein the instructions are executable by the processor to:
  identify an ECCE index associated with each EPDCCH message.

57. The non-transitory computer-readable medium of claim 49, wherein the wireless communications are performed in a wireless communication system that comprises a time division duplexed (TDD) long term evolution (LTE) system.

\* \* \* \* \*